US011019412B2

(12) United States Patent
Samkowiak et al.

(10) Patent No.: US 11,019,412 B2
(45) Date of Patent: May 25, 2021

(54) SYSTEM FOR MONITORING AN INJECTION MOLD OR STAMPING DIE

(71) Applicant: Red E Innovations, LLC, Troy, MI (US)

(72) Inventors: Jeremy Samkowiak, Prudenville, MI (US); James P Stuart, Bloomfield Hills, MI (US); Peter Chan, Lily Lake, IL (US)

(73) Assignee: Red E Innovations, LLC, Troy, MI (US)

( * ) Notice: Subject to any disclaimer, the term of this patent is extended or adjusted under 35 U.S.C. 154(b) by 0 days.

(21) Appl. No.: 16/404,324

(22) Filed: May 6, 2019

(65) Prior Publication Data

US 2019/0342638 A1   Nov. 7, 2019

Related U.S. Application Data

(60) Provisional application No. 62/667,103, filed on May 4, 2018.

(51) Int. Cl.
*H04Q 9/00* (2006.01)
*B21D 22/02* (2006.01)
*B21D 37/10* (2006.01)

(52) U.S. Cl.
CPC ............ *H04Q 9/00* (2013.01); *B21D 22/02* (2013.01); *B21D 37/10* (2013.01); *H04Q 2209/40* (2013.01); *H04Q 2209/823* (2013.01)

(58) Field of Classification Search
CPC ............ H04Q 9/00; H04Q 2209/823; H04Q 2209/40; H04Q 2209/43; B21D 22/02;
(Continued)

(56) References Cited

U.S. PATENT DOCUMENTS

| 5,571,539 A | 11/1996 | Starkey |
| 5,870,698 A * | 2/1999 | Riedel .................. G05B 19/406 700/1 |

(Continued)

FOREIGN PATENT DOCUMENTS

| EP | 2 714 365 | 4/2014 |
| JP | 2011514774 | 5/2011 |

(Continued)

OTHER PUBLICATIONS

Manner Group, "moldMIND II", www.maenner-group.com/en-en/products/moldmind_ii ; website accessed Apr. 30, 2019.

*Primary Examiner* — Ryan W Sherwin
(74) *Attorney, Agent, or Firm* — Boyle Fredrickson S.C.

(57) ABSTRACT

An intelligent monitor system for monitoring an injection mold or stamping die includes sensors, logic and communication paths for improving usability and reliability during monitoring. In one aspect, a monitor can be configured to not only monitor a production cycle count and/or cycle time of an injection mold or stamping die, but also analyze operations of the injection mold or stamping die to adapt to the system. The monitor can analyze, for example, temperatures, pressures, vibrations, location, and/or flow control, among other things, at various points, with flexibility for adding additional monitoring on the fly, to adapt various functions, such as reporting frequency, communication method, power conservation, and the like. The monitor can utilize multiple radios for communicating with a data center, including but not limited to, via relays and/or gateways, to ensure reliable operation. The monitor can also utilize multiple power sources, with circuitry for selectively bypassing unused power sources, for maximum power efficiency.

39 Claims, 13 Drawing Sheets

(58) Field of Classification Search
CPC ......... B21D 37/10; B29C 45/17; B29C 45/76; B29C 2045/1796; G07C 3/10; G06M 1/00
See application file for complete search history.

(56) References Cited

U.S. PATENT DOCUMENTS

| | | | |
|---|---|---|---|
| 6,055,820 A | 5/2000 | Jeong et al. | |
| 6,149,420 A | 11/2000 | Kim et al. | |
| 6,377,649 B1* | 4/2002 | Stuart | B29C 45/17 377/15 |
| 6,471,359 B1 | 10/2002 | Kim et al. | |
| 6,618,241 B2 | 9/2003 | Bang | |
| 6,650,469 B2 | 11/2003 | Kim et al. | |
| 6,685,458 B2* | 2/2004 | Poynor | B29C 45/76 377/15 |
| 6,690,347 B2 | 2/2004 | Jeon et al. | |
| 6,693,679 B1 | 2/2004 | Ahn | |
| 7,038,653 B2 | 5/2006 | Moon | |
| 7,133,092 B2 | 11/2006 | Lee et al. | |
| 7,152,277 B2 | 12/2006 | Jung et al. | |
| 7,195,852 B2 | 3/2007 | Moudry et al. | |
| 7,280,171 B2 | 10/2007 | Oh et al. | |
| 7,289,096 B2 | 10/2007 | Jeon et al. | |
| 7,403,458 B2 | 7/2008 | Lim et al. | |
| 7,433,636 B2 | 10/2008 | Teschendorf et al. | |
| 7,435,468 B2 | 10/2008 | Kim et al. | |
| 7,561,498 B2 | 7/2009 | Kim et al. | |
| 7,580,091 B2 | 8/2009 | Lee et al. | |
| 7,607,805 B2 | 10/2009 | Kwon et al. | |
| 7,612,950 B2 | 11/2009 | Lee et al. | |
| 7,622,738 B2 | 11/2009 | Oh et al. | |
| 7,744,265 B2 | 6/2010 | Kang et al. | |
| 7,864,260 B2 | 1/2011 | Lee et al. | |
| 7,920,221 B2 | 4/2011 | Chang | |
| 8,029,264 B2 | 10/2011 | Choi et al. | |
| 8,040,455 B2 | 10/2011 | Won et al. | |
| 8,043,876 B2 | 10/2011 | Lee et al. | |
| 8,049,161 B2 | 11/2011 | Sherrer et al. | |
| 8,053,968 B2 | 11/2011 | Woo et al. | |
| 8,057,720 B2 | 11/2011 | Kim et al. | |
| 8,097,450 B2 | 1/2012 | Yoo | |
| 8,149,321 B2 | 4/2012 | Ryu et al. | |
| 8,236,435 B2 | 8/2012 | Jang | |
| 8,263,386 B2 | 9/2012 | Yoo | |
| 8,280,544 B2* | 10/2012 | Catoen | B29C 45/76 340/8.1 |
| 8,309,908 B2 | 11/2012 | Sherrer et al. | |
| 8,362,678 B2 | 1/2013 | Yoon et al. | |
| 8,422,893 B2 | 4/2013 | Kim et al. | |
| 8,425,803 B2 | 4/2013 | Parce et al. | |
| 8,439,664 B2 | 5/2013 | Kim et al. | |
| 8,564,523 B2 | 10/2013 | Moon | |
| 8,576,490 B2 | 11/2013 | Bae et al. | |
| 8,587,746 B2 | 11/2013 | Kim et al. | |
| 8,592,037 B2 | 11/2013 | Parce et al. | |
| 8,643,807 B2 | 2/2014 | Lee et al. | |
| 8,785,953 B2 | 7/2014 | Kim et al. | |
| 8,792,173 B2 | 7/2014 | Bae et al. | |
| 8,804,224 B2 | 8/2014 | Cho | |
| 8,831,442 B2 | 9/2014 | Kim et al. | |
| 8,860,908 B2 | 10/2014 | Ro et al. | |
| 8,883,054 B2 | 11/2014 | Starkey | |
| 8,899,955 B2* | 12/2014 | Starkey | B29C 33/70 425/135 |
| 8,969,070 B2 | 3/2015 | Yoo | |
| 8,993,487 B2 | 3/2015 | Yoo | |
| 9,065,033 B2 | 6/2015 | Lee et al. | |
| 9,116,278 B2 | 8/2015 | Kang et al. | |
| 9,136,589 B2 | 9/2015 | Lee et al. | |
| 9,153,759 B2 | 10/2015 | Kim et al. | |
| 9,155,146 B2 | 10/2015 | Lee et al. | |
| 9,202,395 B2 | 12/2015 | Cho et al. | |
| 9,259,868 B2 | 2/2016 | Chun et al. | |
| 9,387,616 B2 | 7/2016 | Olaru | |
| 9,401,464 B2 | 7/2016 | Chung et al. | |
| 9,423,661 B2 | 8/2016 | Jeon et al. | |
| 9,439,250 B2 | 9/2016 | Lee | |
| 9,472,888 B2 | 10/2016 | Song et al. | |
| 9,507,116 B2 | 11/2016 | Choi | |
| 9,512,982 B2 | 12/2016 | You et al. | |
| 9,549,442 B1 | 1/2017 | Bong | |
| 9,578,149 B2 | 2/2017 | Moon et al. | |
| 9,667,111 B2 | 5/2017 | Kim et al. | |
| 9,686,833 B2 | 6/2017 | Bong et al. | |
| 9,691,957 B2 | 6/2017 | Lee et al. | |
| 9,735,070 B2 | 8/2017 | Park et al. | |
| 9,857,614 B2 | 1/2018 | Kim et al. | |
| 9,859,392 B2 | 1/2018 | Lim et al. | |
| 9,915,801 B2 | 3/2018 | Kang | |
| 9,958,599 B2 | 5/2018 | Choi et al. | |
| 9,972,527 B2 | 5/2018 | Kim et al. | |
| 10,020,091 B2 | 7/2018 | Lee et al. | |
| 10,036,845 B2 | 7/2018 | Ha et al. | |
| 10,073,214 B2 | 9/2018 | Yoon et al. | |
| 10,099,938 B2 | 10/2018 | Son et al. | |
| 10,101,610 B2 | 10/2018 | Kang et al. | |
| 10,120,237 B2 | 11/2018 | Yoo | |
| 10,188,350 B2 | 1/2019 | Lee et al. | |
| 10,191,577 B2 | 1/2019 | Choi et al. | |
| 10,203,550 B2 | 2/2019 | Choi | |
| 10,240,036 B2 | 3/2019 | Hyun et al. | |
| 10,247,978 B2 | 4/2019 | Kim et al. | |
| 10,266,696 B2 | 4/2019 | Kim et al. | |
| 2006/0082010 A1* | 4/2006 | Saggese | B22D 17/007 264/40.5 |
| 2006/0129268 A1* | 6/2006 | Conner | B29C 45/76 700/174 |
| 2009/0053346 A1* | 2/2009 | Shnaider | B29C 45/17 425/135 |
| 2011/0261524 A1* | 10/2011 | Wieder | G06F 21/86 361/679.31 |
| 2018/0065286 A1* | 3/2018 | Pruitt | B33Y 80/00 |
| 2019/0007340 A1 | 1/2019 | Starkey | |

FOREIGN PATENT DOCUMENTS

| | | |
|---|---|---|
| JP | 2012091354 | 5/2012 |
| JP | 2018128876 | 8/2018 |
| KR | 1020150005039 | 1/2015 |
| KR | 1020170103151 | 9/2017 |
| KR | 1020170104177 | 9/2017 |

* cited by examiner

SYSTEM FOR MONITORING AN INJECTION MOLD OR STAMPING DIE

CROSS-REFERENCE TO RELATED APPLICATION(S)

This application claims priority to U.S. Provisional Patent Application No. 62/667,103, entitled "System for Monitoring an Injection Mold or Stamping Die," filed on May 4, 2018, which is herein incorporated by reference.

FIELD OF THE INVENTION

The present invention relates to the field of monitoring for injection molds and stamping dies, and more particularly, to an intelligent system for monitoring an injection mold or stamping die which utilizes sensors, logic and communication paths for adapting to operations of the injection mold or stamping die for improving usability and/or reliability of such monitoring.

BACKGROUND OF THE INVENTION

Injection molding machines, also known as an injection presses, are machines for manufacturing products by injecting a molten material, typically plastic, into a preconfigured mold. Injection molding machines typically include an injection unit for receiving the molten material in a predetermined shape and a clamping unit for securing the injection unit. Stamping presses are metalworking machines used to shape or cut a material, typically metal, by deforming it with a die. Stamping presses typically include a bolster plate mounted on a press bed for positioning the material and a ram or slide for striking the material.

Injection molds and stamping dies are typically put into production for manufacturing a particular number of parts. They are then typically moved into storage at either a manufacturer's facility or a third-party warehouse. The molds and dies are typically warranted for a certain number of open/close production cycles when used appropriately. After the maximum number of cycles is reached, the molds or dies may be susceptible to producing damaged and/or unusable parts. Also, the molds or dies may be susceptible to damage even before reaching the maximum number of cycles due to storage, travel, improper use, maintenance, or repair procedures during the life of the molds or dies. Further complicating matters, many molds and dies are made quite differently from one another and are therefore susceptible to failing for different reasons which may depend upon the product being produced, the manufacturer's skill level, the quality of parts, and so forth.

Systems currently exist for counting open/close cycles for molds and dies. However, such systems typically do not aid manufacturers with respect to the other aforementioned problems which molds or dies may encounter during production. A need therefore exists to provide an improved system for monitoring an injection mold or stamping die.

SUMMARY OF THE INVENTION

An intelligent monitor system for monitoring an injection mold or stamping die includes sensors, logic and communication paths for improving usability and reliability during monitoring. In one aspect, a monitor can be configured to not only monitor a production cycle count and/or cycle time of an injection mold or stamping die, but also analyze operations of the injection mold or stamping die to adapt to the system. The monitor can analyze, for example, temperatures, pressures, vibrations, location, and/or flow control, among other things, at various points, with flexibility for adding additional monitoring on the fly, to adapt various functions, such as reporting frequency, communication method, power conservation, and the like. The monitor can utilize multiple radios for communicating with a data center, including but not limited to, via relays and/or gateways, to ensure reliable operation. The monitor can also utilize multiple power sources, with circuitry for selectively bypassing unused power sources, for maximum power efficiency.

In one aspect, in order to properly maintain an injection mold, molding machine, stamping die or stamping press, both artificial intelligence and user-addable sensor mechanisms can be used. User-addable sensors can allow the proper sensors for each individual mold or die to be chosen and installed by a user of the system at any time so that each mold or die can have its possible problem points monitored for proper action, whether it be pressure, vibration, movement, location, temperature, water flow, water presence, temperature rise or fall, or other possibilities. This information could be used, for example, to demonstrate proper or improper use when making a warranty or other claim. Furthermore, using the information provided by the aforementioned sensor mechanisms can allow the mold or die monitor to automatically change its operational parameters via machine learning and/or artificial intelligence techniques, such as by allowing the monitor to send warnings only when needed, to increase and/or decrease transmission frequency, power and radio type used, to alter threshold levels as to when warnings are sent, and/or to stop or start operations in order to protect the monitor itself from damage, among other things.

Accordingly, a plastic injection mold, stamping die or similar production tool or asset can be fitted with a monitor. This monitor can track the presence of magnetic fields and/or motions and/or vibrations to maintain a production cycle count as well as a time period required for each cycle to complete. The monitor can also include a Bluetooth Low Energy (BLE) beaconing system, and/or other wireless location monitoring electronics, such as a Global Positioning System (GPS), 400 MHz beaconing radio, 868 MHz beaconing radio, 900 MHz beaconing radio, 2.4 GHz beaconing radio, and the like, which could be configured according to country of operation, to determine a location of a mold or die. The monitor can also maintain a temperature record for the monitor, including tracking temperature rise and fall, over a time period. The monitor can also select and connect multiple other electronic devices, via wire and/or wireless communication methods, for tracking and notifying a user based on predetermined conditions, such as vibration, movement, liquid flow, liquid presence, magnetic field characteristic, temperature and/or other phenomena. Additionally, the monitor can analyze the data collected and alter its operations and/or reported information based on the data. The monitor can include multiple transmission systems allowing for greater connectivity options and better chances of a successful transmission. The monitor can also include an electronic tamper detection circuit for producing a warning if an enclosure of the monitor is opened or closed. The monitor can also include a unique code or serial number for allowing an owner to coordinate each monitor's data to a corresponding mold or die.

The monitor can be attached to a mold, die or other reciprocating tool. An actuator can also be installed on the mold, die or tool in a manner that it will be moved to within close proximity of the monitor, such as the top, and then moved beyond a sensor reset point of the monitor on each close/open operation. The monitor is removable. In one aspect, the monitor's housing must be opened in order to detach it from the mold, die or tool, which could cause a tamper action to be detected, tracked and/or reported by the monitor. Once the housing is closed, an end tamper event can be logged and/or transmitted from the monitor. However, in other aspects, the monitor can be detached from the mold, die or tool without opening the case. Preferably, in operation, the monitor can be fixed to an injection mold or stamping die and remain fixed during operation of the injection mold or stamping die. The monitor can include at least one wireless transceiver using a 400 MHz, 868 MHz, 900 MHz, 2.4 GHz, BLE, Long Term Evolution (4G) category M1 (LTE Cat-M1), LTE CAT 1-4, or other technology for transmitting and receiving data. Multiple transceivers can be installed in a single monitor to provide transmit/receive redundancy, failover mechanisms to improve operational reliability, location tracking accuracy and/or power conservation. The monitor can be powered by one or more primary cell batteries and/or rechargeable cell batteries, an Alternating Current (AC) power source, a Universal Serial Bus (USB) power source, or a Direct Current (DC) power source. The monitor can charge the rechargeable batteries installed in the monitor housing when any other acceptable power source is connected at the same time. In one aspect, the monitor can be contained in a water proof aluminum housing having between zero and many antenna ports, such as zero to five antenna ports. Additionally, the housing can include a port for attaching one or more of the aforementioned power sources, as well as a port for attaching one or more add-on-electronic sensors to the power port in a daisy-chain and/or a separate port with the ability to daisy-chain multiple add-on-sensor-electronics together. The add-on-sensors need not be all of the same type. For example, a vibration sensor, a flow sensor, a GPS location sensor and a water presence sensor could all be daisy chained together through one of the available add-on-sensor ports in the monitor's housing. Data collected from internal and/or add-on sensors can be stored and/or analyzed by the monitor before transmission from the monitor. Analysis of the collected data can be used to manipulate several functions and/or behaviors provided by the monitor, including temporarily slowing, speeding, removing and/or adding of sensor polling, transmission strength, transmission frequency, transmission type, transmission mechanism used, counting operations, battery monitoring, vibration monitoring, location monitoring and several other factors including, but not limited to, temporarily shutting down one or more operations which could be related to monitoring, such as radio operation, in order to protect the monitor from damage, such as due to an over temperature condition. The monitor can also include a unique identifier that can be scanned by device implementing a corresponding application, which could be a mobile application, to allow instant access to the mold, die or tool data that is collected by the monitor or manually added to the database.

Specifically then, one aspect of the present invention can provide a system for monitoring an injection mold or stamping die, including: multiple sensors, including: a first sensor for detecting at least one of an opening and closing of an injection mold or stamping die; and a second sensor for detecting a predetermined characteristic; a radio communication device; and a processor in communication with the sensors and the radio communication device. The processor can execute a program stored in a non-transient medium to: maintain a count of production cycles for an injection mold or stamping die according to detection by the first sensor; and transmit a message including the count via the radio communication device. The message can be transmitted following detection of the predetermined characteristic.

The second sensor could be a temperature sensor for detecting a temperature of an injection mold or stamping die and the predetermined characteristic could be detecting a maximum or minimum temperature. The second sensor could be an accelerometer for detecting an acceleration or deceleration of an injection mold or stamping die, and the predetermined characteristic could be detecting a maximum acceleration or deceleration. The second sensor could be a vibration sensor for detecting changes in vibration in molds, dies, and production machinery and the predetermined characteristic could be detecting vibration amplitude and/or frequency exceeding a threshold. The second sensor could be a location sensor for detecting a location of an injection mold or stamping die and the predetermined characteristic could be detecting a change in location by a distance or direction exceeding a threshold. The second sensor could also be a flow sensor, and the predetermined characteristic could be detecting a liquid flow rate. The system could further include an enclosure, the radio communication device and the processor could be housed in the enclosure, the second sensor could be a tamper sensor for detecting an opening or closing of the enclosure, and the predetermined characteristic could be detecting an opening or closing of the enclosure. The tamper sensor could comprise, for example, a TMR sensor, an JR sensor or the like.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE OF THE INVENTION

Figure 1:
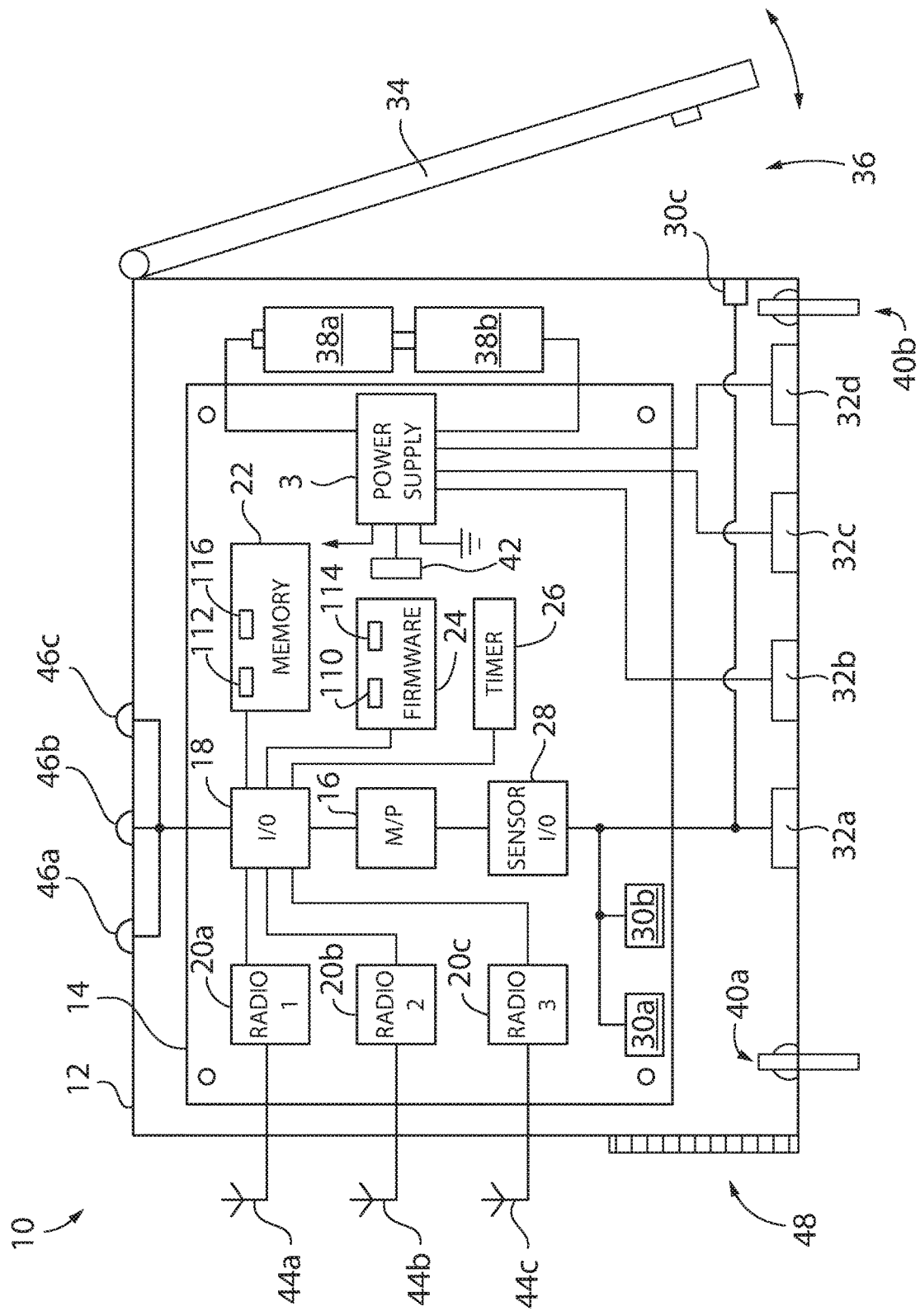
FIG. 1 is a block diagram of an intelligent monitor which could be used for monitoring an injection mold or stamping die in accordance with an aspect of the invention.

Referring now to FIG. 1, in accordance with an aspect of the invention, a block diagram of an intelligent monitor 10 which could be used for monitoring an injection mold or stamping die is provided in accordance with an aspect of the invention. The monitor 10 can comprise an enclosure 12 housing a Printed Circuit Board (PCB) 14 mounted therein. The PCB 14 can support thereon multiple sensors, logic and communication paths for improving usability and reliability during monitoring of the injection mold or stamping die. In particular, the PCB 14 can support thereon a processor 16, which could be a microprocessor, microcontroller or other logic processing element, system communication I/O 18, one or more radio circuits 20 (identified as 20a, 20b, 20c), a non-transient medium memory 22, a non-transient medium firmware 24, a timer 26 (which could be implemented by a microcontroller with the processor 16), a sensor I/O 28, one or more electronic sensors 30 (identified as 30a, 30b, 30c) and/or power supply circuit 31. The processor 16 and one or more portions of the system communication I/O 18, radio circuits 20, memory 22, firmware 24, timer 26, sensor I/O 28 and/or sensors 30 could be implemented, for example, by a BMD-300 series System on a Chip (SoC) as available from Rigado, Inc. of Salem, Oreg.

The enclosure 12 can be a water resistant, hermetically sealed housing which could include one or more access ports 32 and/or access panels 34. The enclosure 12 is preferably formed from a lightweight, durable metal, such as aluminum, and can include O-rings, gaskets and/or other sealants around the access ports 32 and/or access panels 34. The access ports 32 can include, among other things, a combination sensor and power delivery port 32a, a Universal Serial Bus (USB) port 32b, an Alternating Current (AC) power port 32c, and/or a Direct Current (DC) power port 32d. The sensor and power delivery port 32a could be, for example, a connection port for a signaling system, such as an I²C bus, and power delivery for daisy-chained add-on electronic sensors 30 external to the enclosure 12. In one aspect, an access panel 34 could be a front half 12a of the enclosure 12 which opens to separate from a back half 12b of the enclosure 12 (FIG. 2C). In another aspect, an access panel 34 could comprise a hinged door configured to swing inwardly and outwardly with respect to the enclosure 12 for revealing an access area 36 for accessing an interior of the enclosure 12. Opening the access panel 34 may be required for changing one or more batteries 38 (identified as 38a, 38b) housed in the enclosure 12. Opening the access panel 34 may be required for accessing one or more fasteners 40 (identified as 40a, 40b) for fastening or unfastening the monitor 10 to an injection mold or stamping die. Opening the access panel 34 may also be required for servicing or replacing the PCB 14 and/or elements supported thereon, including changing settings with respect to jumper block 42 connected to the power supply circuit 31, which settings will be described more fully herein.

In certain aspects, various elements can be readily apparent external to the enclosure 12. For example, one or more external antennas 44 (identified as 44a, 44b, 44c), for the one or more radio circuits 20, can protrude from the enclosure 12 as necessary for effective radio communication. Also, one or more Light Emitting Diodes (LED's) 46 (identified as 46a, 46b, 46c), for indicating for states, power levels and conditions of the monitor 10, can protrude from the enclosure 12 as necessary for apparent viewing by a user. Also, indicia 48, which could be a Quick Response (QR) code, bar code, alpha numeric sequence or other unique identifier, can be affixed to the enclosure 12 as necessary for apparent viewing by a user and/or scanning by a mobile device. The indicia 48 can allow an owner to coordinate the monitor's data to a corresponding mold or die. A unique identifier 114 corresponding to the indicia 48 can also be programmed and stored in the firmware 24.

Figure 2A:
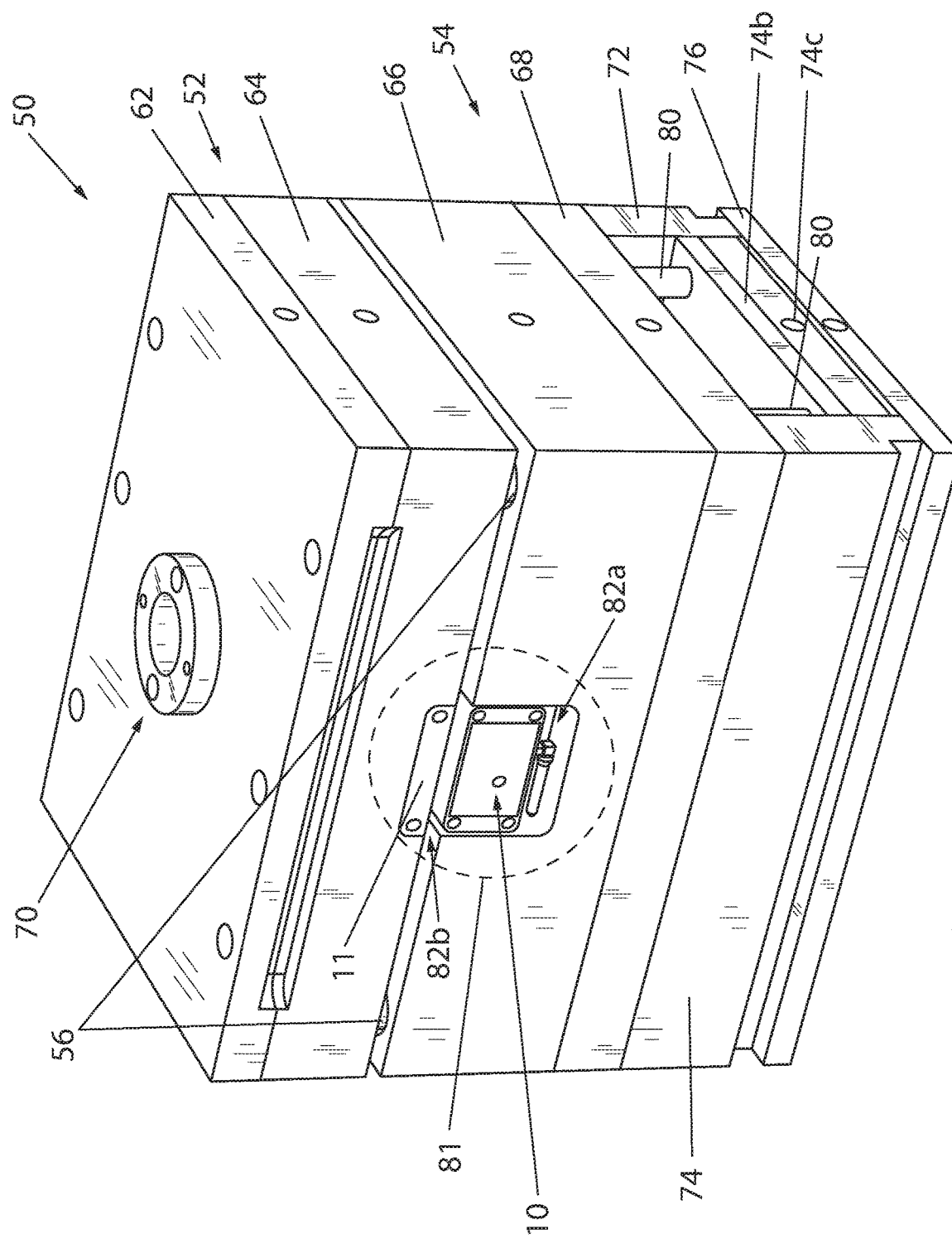
FIG. 2A is an isometric view of an exemplar plastic injection mold which could include the monitor in accordance with an aspect of the invention.
Figure 2B:
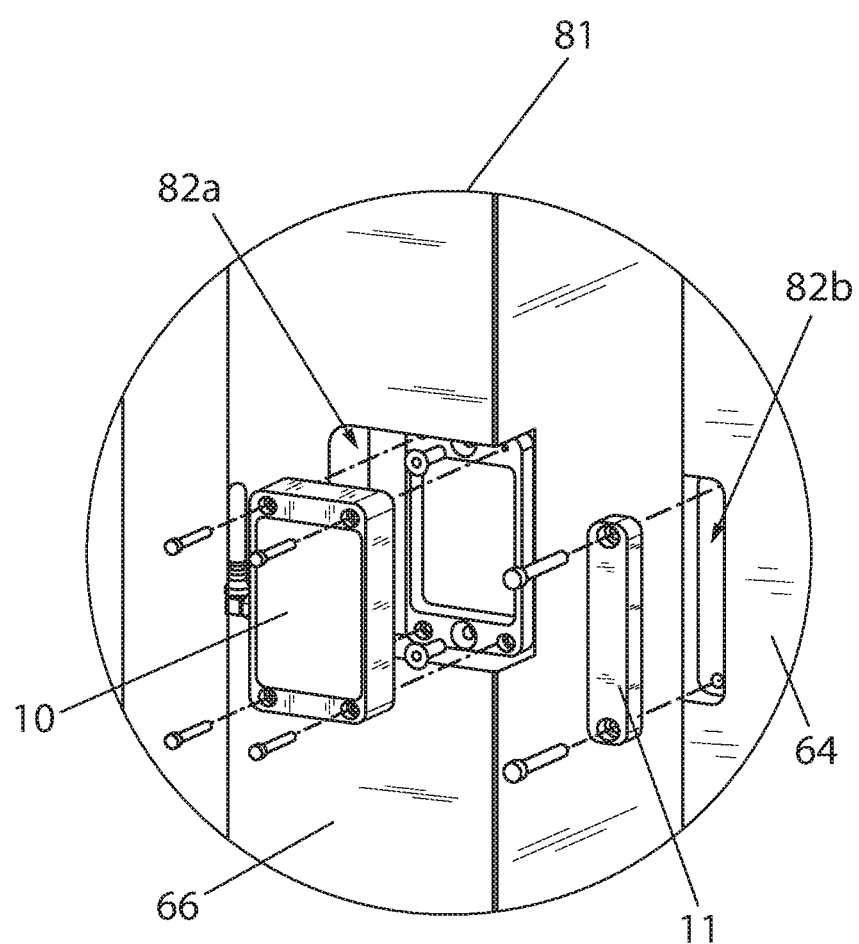
FIG. 2B is a detailed isometric view of attachment of the monitor of FIG. 1 to the mold of FIG. 2A in accordance with an aspect of the invention.
Figure 2C:
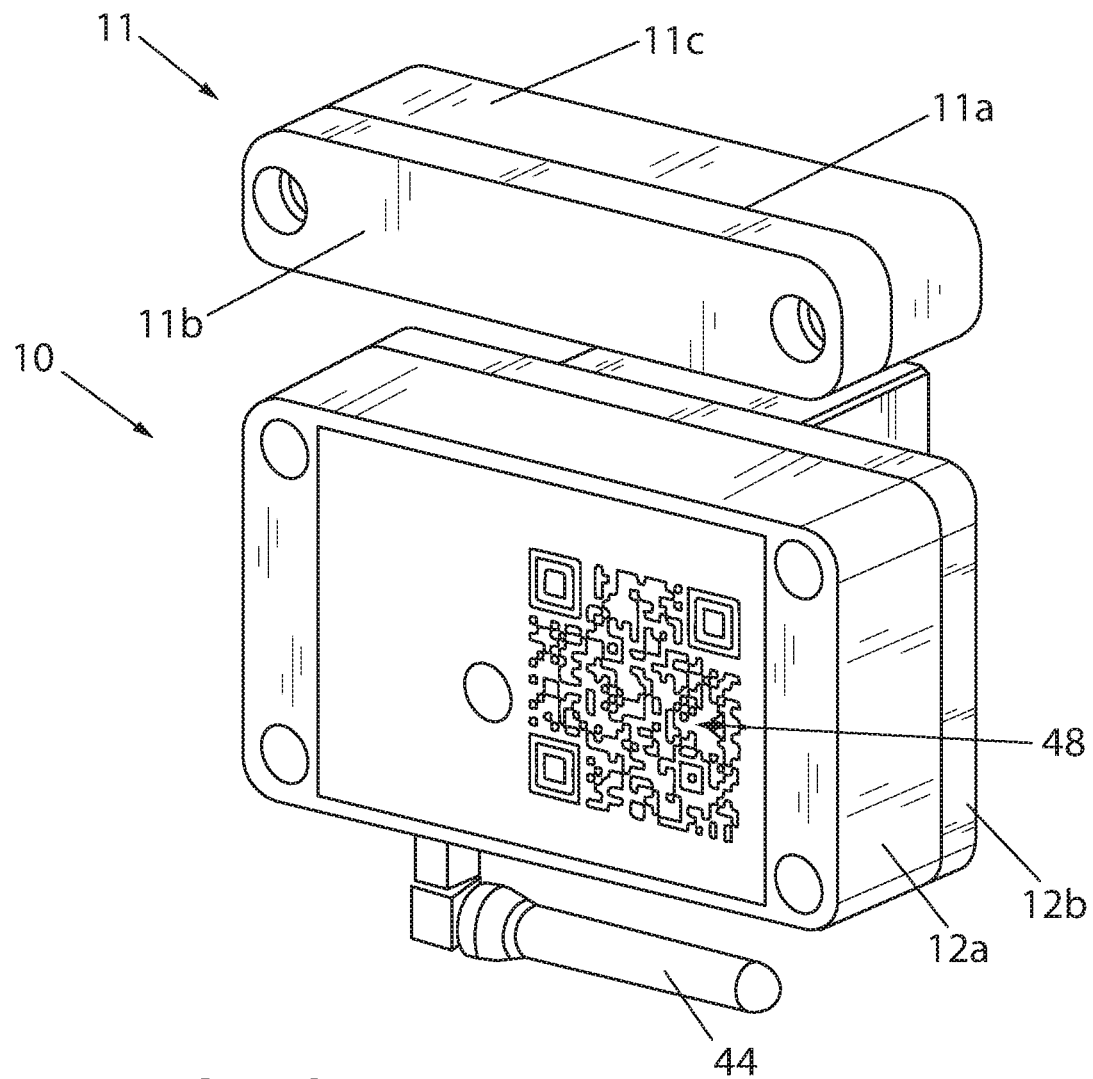
FIG. 2C is a plan view of an exemplar monitor which could be attached to the mold of FIG. 2A in accordance with an aspect of the invention.

With additional reference to FIGS. 2A-C, in one aspect, the monitor 10 could be attached to a plastic injection mold 50. The mold 50 could have an upper mold half 52 that cooperates with a lower mold half 54 with one or both of the mold halves 52, 54 having or carrying a cavity in which a moldable material, such as plastic, is injected and formed. For example, the upper mold half 52 could define a cavity and the lower mold have 54 could define a core. Opening and closing of one mold half 52 relative to the other mold half 54 during each molding cycle can be guided by leader pins which can be guided in a corresponding bushing 56. Each mold half 52, 54 can be respectively formed of mold plates 62, 64, 66 and 68. Such plates 62-68, for example, can include a top clamp plate 62, an "A" plate 64, a "B" plate 66, and support plate 68. The top clamp plate 62 includes an upper sprue or opening 70. Below the lower mold half 54 are a pair of spaced apart side plates 72, 74 that are disposed on a lower mold plate 76. Between the side plates 72, 74 is a rail which encloses an ejector plate 74b and an ejector back plate 74c. The ejector plate 74b and ejector back plate 74c are guided up and down during molding by ejector plate guide return pins 80. With additional reference to FIG. 2B, in a detailed isometric view 81, the monitor 10 could be mounted in a pocket 82 via mounting apertures and fasteners, such as screws. In one aspect, the pocket 82 could be formed as an upper pocket 82b in the upper mold half 52 (such as a pocket in the "A-plate" 64) and a correspondingly opposing lower pocket 82a in the lower mold half 54 (such as a pocket in the "B-plate" 66). The monitor 10 can be mounted in one of the pockets 82, such as the lower pocket 82a as shown, and an actuator 11 can be correspondingly mounted in the other pocket, such as the upper pocket 82b as shown. Accordingly, in one aspect, the monitor 10 and the actuator 11 can each be attached to the mold 50, in the pocket 82, so that the monitor 10 and the actuator 11 are flush with surfaces of the mold 50 while still opposing one another across an opening/closing of the mold 50. The monitor 10 can use the actuator 11 in one way to count production cycles of the mold 50 by detecting when the actuator 11 is in proximity to the monitor 10, such as within about 0.375 inches, and when the actuator 11 is not in proximity to the monitor 10, such as beyond about 0.375 inches. Such distances in "proximity" can vary form one implementation to another, such as according to size and strength of magnetized elements (magnets) being used in the system. Using a magnetized element advantageously allows counting production cycles without excessive wear and tear associated with using a mechanical function to track cycles, such as a spring and plunger mechanism. The actuator 11 could include, for example, a magnetized element 11*a*, held between front and back actuator supports 11*b* and 11*c*, respectively, in which a magnetic sensor of the monitor 10, such as a Tunnel Magnetoresistance (TMR) sensor, an Anisotropic Magnetoresistance (AMR) sensor, a Hall Effect sensor and/or a Reed switch, can detect when the monitor 10 is proximal to the actuator 11. An isometric view of an exemplar monitor 10 and actuator 11, each of which could be attached to the mold 50, is shown in FIG. 2C. In another aspect, the monitor 10 and/or actuator 11 could be attached to a plastic injection molding machine providing operation for the mold 50.

Figure 2D:
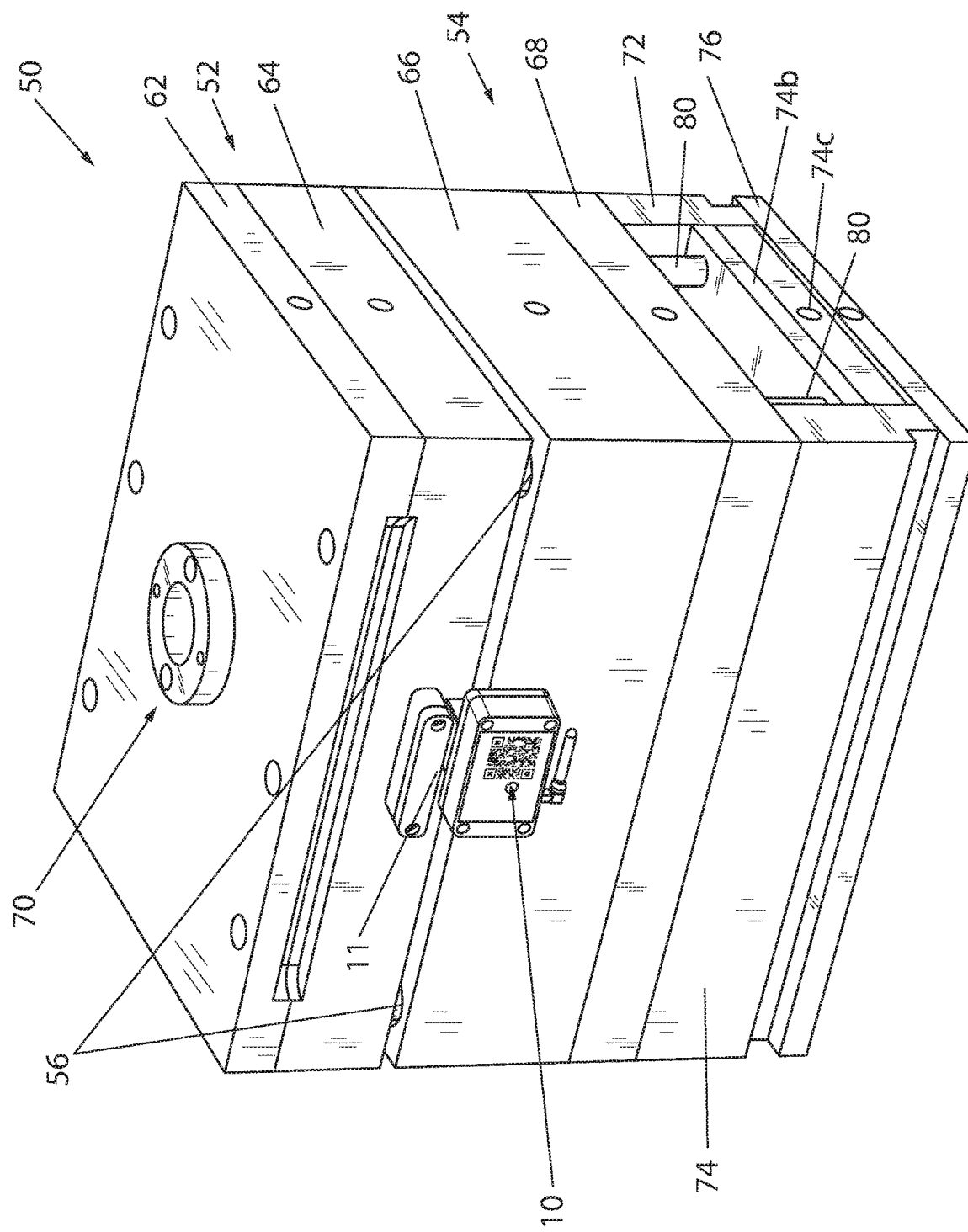
FIG. 2D is an isometric view of an exemplar plastic injection mold which could include the monitor in accordance with another aspect of the invention.

With additional reference to FIG. 2D, in another aspect, the monitor 10 and the actuator 11 could be advantageously attached to a side of the mold 50, correspondingly between the upper mold half 52 and the lower mold half 54. For example, as illustrated, the monitor 10 could be attached to a side of the lower mold half 54, and actuator 11 could be correspondingly attached to a side of the upper mold half 52, so that the monitor 10 and the actuator 11 are opposing one another. Alternatively, the monitor 10 could be attached to a side of the upper mold half 52, and the actuator 11 could be correspondingly attached to a side of the lower mold half 54. Accordingly, a monitor 10 and actuator 11 could be conveniently mounted at any desirable location between the mold halves. Also, multiple monitors 10 and actuators 11 could be conveniently mounted on a single mold 50 at different positions.

Figure 3:
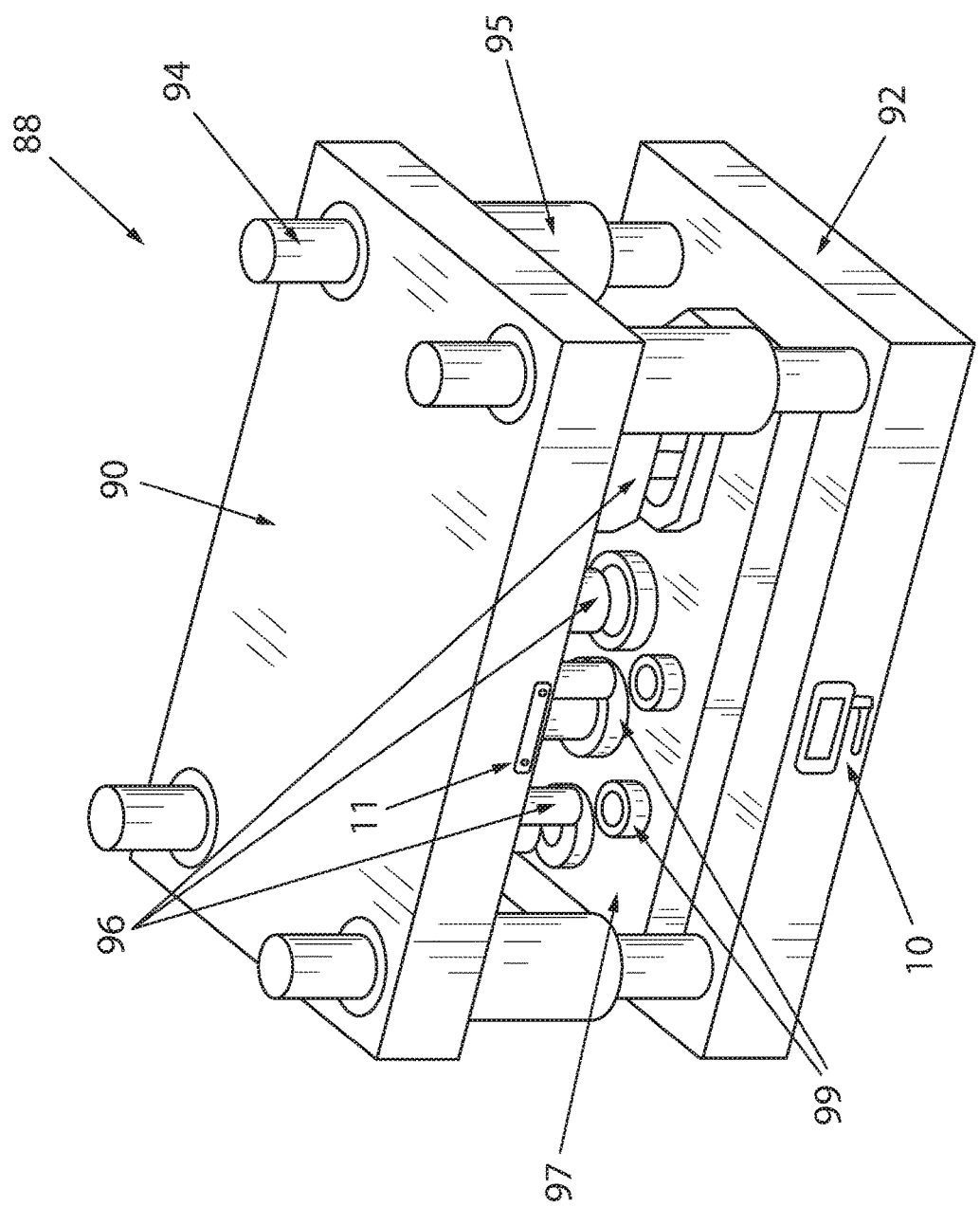
FIG. 3 is an isometric view of an exemplar set of stamping dies which could include the monitor of FIG. 1 in accordance with an aspect of the invention.

With additional reference to FIG. 3, in another aspect, the monitor 10 and/or actuator 11 could be attached to a set of stamping dies 88 having a set of stamping die plates or shoes 90, 92 movable relative to one another on guides 94 (with guide bushings 95 disposed between the shoes 90) for producing a stamping pattern (which could be a three dimensionally contoured opposed die plate surface, formed or otherwise configured in one or both shoes 90, 92). Punches and pilots 96, a die block 97 and/or die buttons 99 can also be disposed between the shoes 90 as known in the art. One of the stamping die shoes can include a pair of outwardly extending mounts enabling releasable mounting in a stamping press or the like. Similar to the mold 50, the stamping die shoes can also be configured with a monitor 10 and/or actuator 11. Similar to the mold 50 discussed above, the monitor 10 and the actuator 11 could be advantageously attached to a side of the shoes 90, 92, correspondingly between the upper shoe 90 and the lower shoe 92. For example, as illustrated, the monitor 10 could be attached to a side of the lower shoe 92, and actuator 11 could be correspondingly attached to a side of the upper shoe 90, so that the monitor 10 and the actuator 11 are opposing one another. Alternatively, the monitor 10 could be attached to a side of the upper shoe 90, and the actuator 11 could be correspondingly attached to a side of the lower shoe 92. Accordingly, a monitor 10 and actuator 11 could be conveniently mounted at any desirable location between the shoes. Also, multiple monitors 10 and actuators 11 could be conveniently mounted on a single set of stamping dies 88 at different positions. In addition, in another aspect, similar to attachment to the mold 50 as described above with respect to FIG. 2A, a monitor 10 and actuator 11 could be attached in opposing pockets of shoes 90, 92 Referring back to FIG. 1, after attachment of the monitor 10 to an injection mold or stamping die and delivery of power (such as installation of batteries 38), the monitor 10 can power up and initialize according to pre-stored parameters 110 held in the firmware 24. The monitor 10 can then execute a program 112 stored in the memory 22 for monitoring, intelligent operation and reporting.

Figure 4:
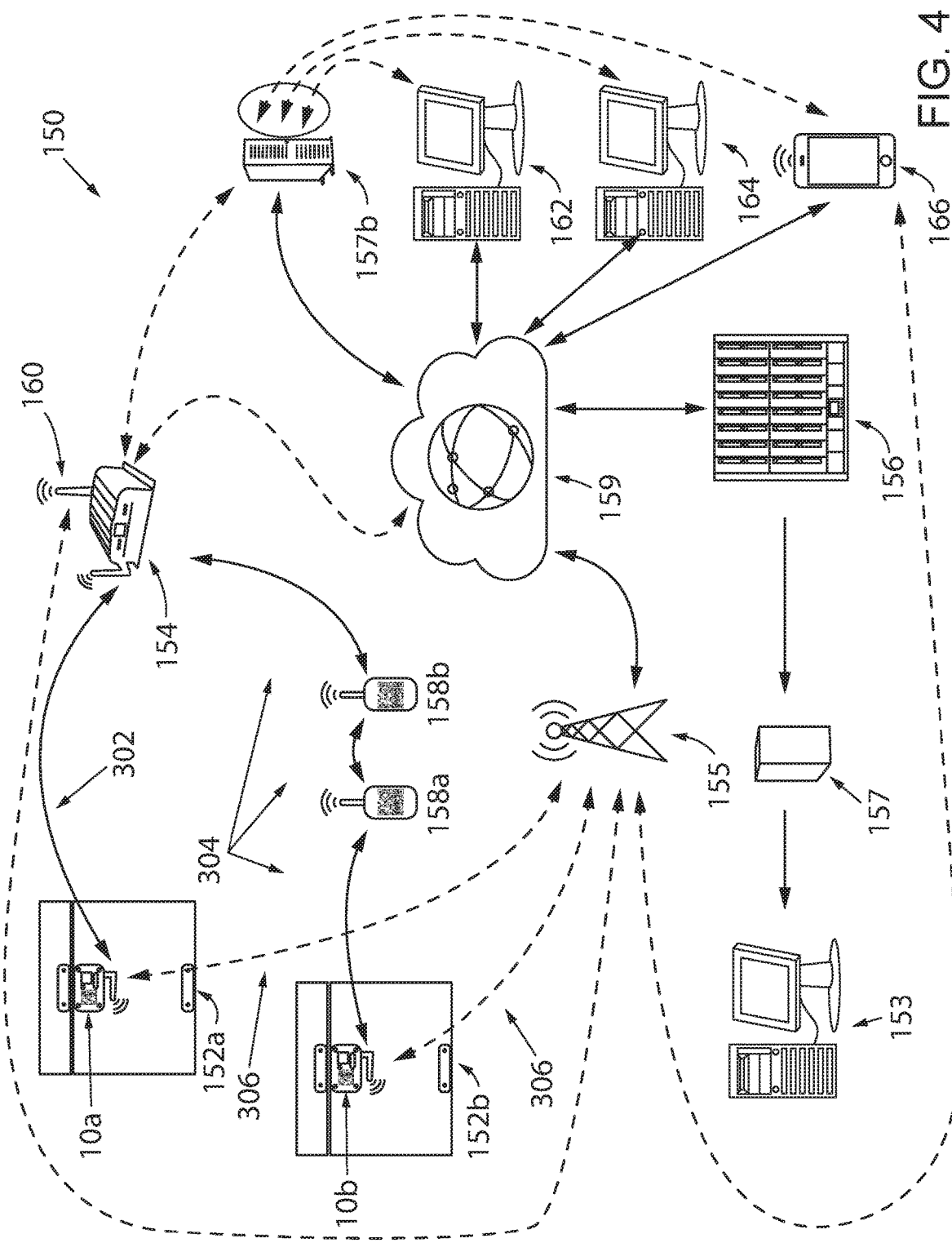
FIG. 4 is an exemplar system including multiple monitors in accordance with an aspect of the invention.

With additional reference to FIG. 4, in an exemplar injection mold or stamping die system 150, multiple production elements 152, which could be injection molds, stamping dies or a combination thereof, can be present in a manufacturing environment. Each production element 152 can include a monitor 10 attached thereto, such as monitor 10*a* attached to production element 152*a*, monitor 10*b* attached to production element 152*b*, and so forth. When a reporting event occurs at a production element 152, such as reaching a predetermined count of production cycles, reaching a maximum temperature or vibration tolerance, or the like, the corresponding monitor 10 can send a message indicating such event. Further examples of events which could trigger transmission of a message could include one or more of: transmitting after a given amount of time, which time could reset if another transmission takes place due to another event; transmitting after a given number of cycles have been counted; transmitting after a given high or low temperature has been detected; and/or transmitting after a given high or low cycle time has been detected; transmitting after detecting a start and/or end of tamper event via the tamper sensor; and/or transmitting after detecting a manual press of a transmit button the monitor 10. In one aspect, an event which could be detected includes detecting an actuation time occurring within a predetermined amount of time which can be relatively short, such as 1.00, 0.75, 0.2 or 0.1 seconds. Accordingly, the system can provide a high-speed detection ability advantageously enabled by proximity sensing. Such events can be remotely configured on the monitor 10, such as after receiving an update with an acknowledgement message from the gateway 154 and/or the data center 156.

For example, in a first communication path 302, providing local network communication, a given monitor 10 can send the message to a gateway 154. The gateway 154, in turn, can store the message and/or process the message for forwarding to a data center 156, or to a customer's server configured as an operations master 157*b*, which may include a server providing data storage, processing, notification generation and/or a user interface or web service. However, if a distance to the gateway 154 exceeds a certain range, in a second communication path 304, the monitor 10 can send the message through one or more repeaters 158 (identified as 158*a*, 158*b* by way of example) for routing the message to the gateway 154. Accordingly, each repeater 158 can be strategically placed in the system 150 to ensure the monitors 10 can communicate with the gateway 154. Each monitor 10 can use a first radio circuit 20*a* for communicating in the first communication path 302, which could be configured to communicate, for example, in a 400 MHz, 868 MHz, 900 MHz or 2.4 GHz ISM (Industrial, Scientific and Medical) radio band. Each repeater 158 can provide "piggy-backing," allowing the message to be relayed from one repeater 158 to another, until reaching the gateway 154. The first radio circuit 20*a* could be implemented, for example, by an XBee Pro Radio Frequency (RF) Module as available from Digi International Inc. of Minnetonka, Minn.

In a third communication path 306, providing wide area network communication, such as through cellular communication, a monitor 10 can send the message to the data center 156 (and/or the gateway 154 if necessary) via an alternate radio. Each monitor 10 can use a second radio circuit 20b for communicating in the third communication path 306, which could be configured to communicate, for example, using cellular network communication, such as Long Term Evolution (4G) category M1 (LIE Cat-M1), LTE CAT 1-4, or other technology for transmitting and receiving data, with a cellular network service 155. The cellular network service 155, in turn, can route the message to the data center 156 through a Wide Area Network (WAN) 159, such as the Internet. Additional radio circuits 20 can be used to advantageously implement even more communication paths in this regard. This can provide multiple communication methods in which a monitor 10 can communicate with the gateway 154 and/or the data center 156 and/or a customer server acting as an operations master 157b. The multiple communication methods can provide a back-up in case of failure of any one communication method, a back-up in case of unavailability of the gateway 154, an alternative for battery power conservation, an alternative based on current sensor readings, such as current speed or temperature, and/or an alternative based on previously gathered information of historic transmissions at a particular location (such as preselecting radios for transmission when in particular locations based on previous successes and/or failures with the radios at the particular locations). The multiple communication methods also provide alternatives for communicating which may be selected based on various factors, such as speed, reliability, cost, power conservation and the like. In one aspect, a monitor 10 could include a single primary transmitting radio, such as a 400, 868 or 900 MHz or 2.4 GHz radio, and a backup cellular network radio. In another aspect, a monitor 10 could include even more radios, such as a first 400, 868 or 900 MHz or 2.4 GHz radio, a second 400, 868, or 900 MHz or 2.4 GHz radio, a cellular network radio, and a Bluetooth radio.

Also, if the gateway 154 does not have access to the data center 156, such as via the Internet, Wi-Fi, wired connection, or the like, the gateway 154 can include a cellular radio 160 for communicating with the data center 156 using cellular network communications. In this instance, the gateway 154 could also communicate with the cellular network service 155 to reach the data center 156, via a wide area network 159, such as the internet.

A laptop, tablet, smart phone or other workstation 162 connected to the data center 156, via the wide area network 159, or connected to a customer server used as an operations master 157b via local area connection using Wi-Fi, a wired network, or the like, or via the wide area connection 159 can be implemented by a user for monitoring operations of the production elements 152 in the system 150. The workstation 162 can, among other things, download data about the production elements 152 from the monitors 10 and prepare analytics with respect to the system 150. Information collected from the monitors 10 can include, for example, a count of production cycles for an injection mold or stamping die according to motion of the injection mold or stamping die detected by a sensor 30, a time for each cycle according to an elapsed time of the injection mold or stamping die to cycle as measured by the timer 26, as well as other characteristics reported by a sensor 30, such as water flow, temperature, vibration, location, water presence, and so forth.

One or more users that are subscribers can use computers 164, such as PC's, servers, tablets, smartphones, and the like connected to the WAN 159, to subscribe to the gateway 154 and/or data center 156 and/or the customer server acting as the operations master 157b for receiving information and updates about the system 150, including the aforementioned count, time and other characteristics for each mold 50. For example, from a computer 164, a subscribed user could log into a portal via the user interface, web service and/or other access of the data center 156, select a monitor 10 and configure various notifications, such as to notify the subscriber every 10,000 production cycle counts, or to notify the subscriber if a production cycle time goes above a predetermined threshold, such as 90 seconds. Accordingly, an administrator of the subscriber's account can select which users in the system (subscribers on computers 164) can be subscribed to which notifications and how such notification should occur (such as email, text message, application pop up, and the like). When a notification situation occurs, appropriate subscribers on computers 164, or any other device providing access to the chosen subscription mechanism or email, text message, notification pop-up and the like, can receive corresponding notifications detailing the situation, the current values of the other sensors on that monitor, which notification was specifically triggered and which individual value triggered it, since each monitor 10 can have many notifications assigned to it and each notification can have many possible trigger events and values. For example, a monitor 10 can have one notification to alert for low battery, another notification to alert every 10,000 cycles and yet another notification if the cycle time goes above 90 seconds, or, the monitor could have one notification with all three of the foregoing triggering types built into the single notification.

In one aspect, the data center 156 can provide a software integration service for a server 157. With the software integration service, the server 157 can request updated information from the data center 156, including any changes in the system reported by monitor 10 since a previous update to the server 157 was provided, for the server 157 to update a database and provide to one or more computers, such as computer 153. In another aspect, the data center 156 can provide a forwarding service for the server 157. With the forwarding service, the data center 156 can update the server 157 each time a transmission or message arrives from a monitor 10, regardless of whether any collected values have changed, for the server 157 to update the database and provide to the one or more computers, such as computer 153.

Also, in one aspect, a mobile device 166, such as a smartphone or tablet computer, which could be a subscriber on a computer, can execute an application to obtain such information and updates about the system 150. The mobile device 166 can advantageously search by asset number or tool number and/or scan the indicia 48 of a particular monitor 10 in the field, using a camera portion of the mobile device 166, thereby causing the mobile application to communicate with the data center 156 or the customer server acting as an operations master 157b, via the user interface, web service and/or other access, which could be implemented by a web service, to obtain such information and updates about a production elements 152 to which the monitor 10 is attached. Searching by asset number or tool number can allow locating information about each mold or die. In one aspect, monitored assets can also be linked together, such as by the indicia, asset or tool number, so that searching for or scanning one asset further allows access to the linked assets. For example, if first and second assets are linked together, a user could scan the first asset then choose to show linked items to find the second asset to further view information of the second asset. The mobile device 166 can then issue commands and/or updates to the monitors 10 for implementing intelligent control. Moreover, like the workstation 162, the mobile application can receive user input issue commands and updates to the monitor 10.

The system 150 can also provide effective location tracking. In one aspect, location tracking could be accomplished by a GPS location sensor (onboard or external) monitored by the monitor 10. For example, a radio circuit 20 could implement the GPS location sensor with a ZOE-M8 series System in Package (SiP) as available from u-blox America, Inc. of Reston, Va. In another aspect, location tracking could be accomplished by beacons, such as Bluetooth beacons, emitted by the monitor 10, such as via a third radio circuit 20c, the repeaters 158, the gateway 154 and/or any other detectable device having a measurable signal strength at each, then interpolating a position based on points that respond and signal strengths at each point. A monitor 10 could determine a closest repeater 158, gateway 154, anchor and/or other device based on detection of a closest beacon emitted by a repeater 158, gateway 154 or other device. The monitor 10 can then execute to interpolate positions based on all points that respond with the signal strengths determined at each point. This arrangement may be advantageous when monitor 10 is battery powered, thereby power limited, and the repeater 158, the gateway 154 and other anchor points are not. Alternatively, the monitor 10 could emit a beacon to which a closest repeater 158 and/or gateway 154 and/or anchor point can respond. This arrangement may be advantageous when the repeaters 158, anchor points or other hardware items are battery powered, thereby power limited, and the monitor 10 is not.

Figure 5:
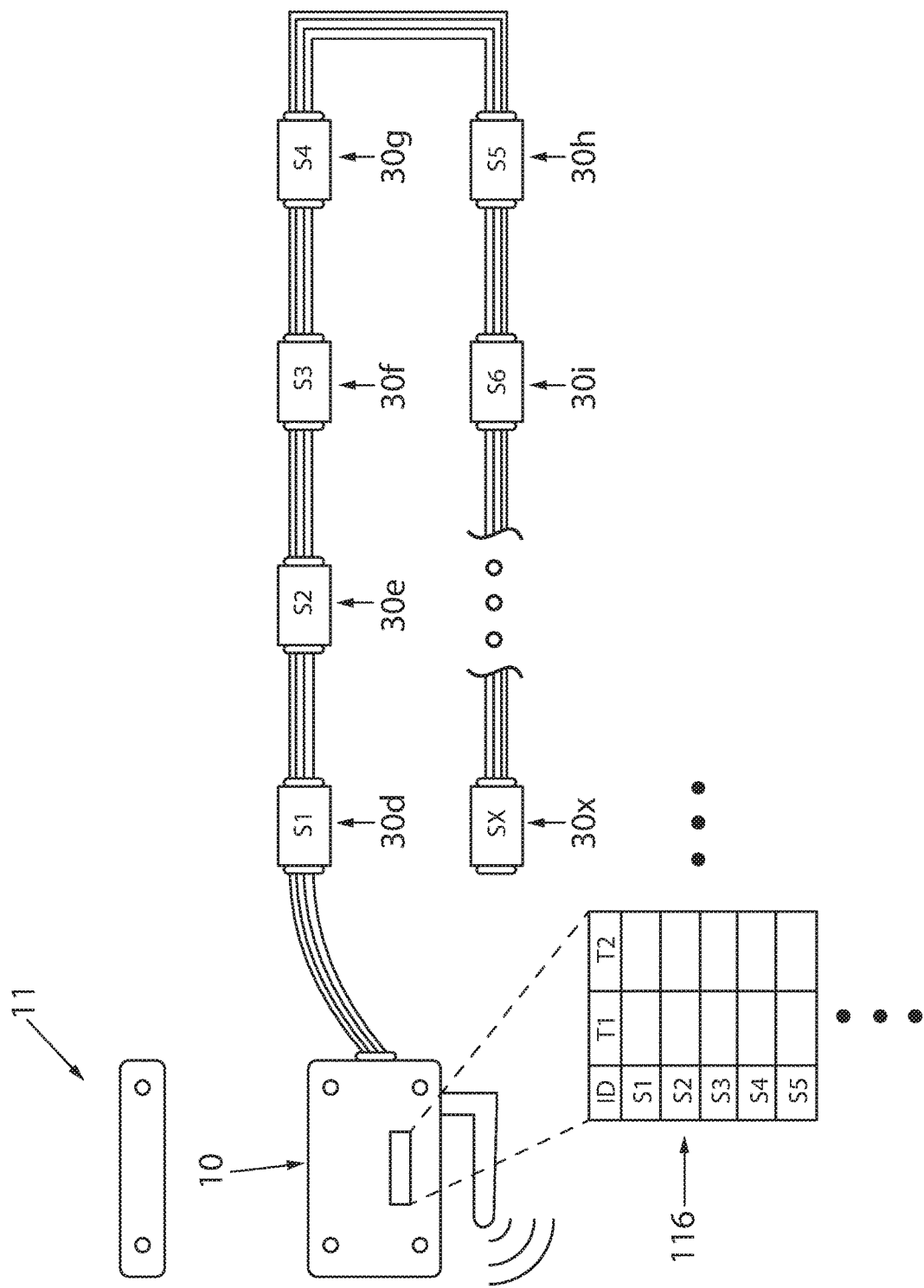
FIG. 5 is an exemplar system for implementing intelligent control with sensors in accordance with an aspect of the invention.

With additional reference to FIG. 5, to implement intelligent control, the monitor 10 can utilize multiple sensors, including onboard sensors in the enclosure 12, such as the electronic sensors 30a, 30b, 30c of FIG. 1, and external sensors outside of the enclosure 12, such as electronic sensors 30d-30x, strategically placed at areas in and around an injection mold, stamping die or correlated parts (such as monitoring an end of an arm tooling for pressure or vibration and maintaining such monitored information with the mold). Accordingly, the monitor 10 can analyze various characteristics, such as temperatures, pressures, vibrations, location, and/or flow control, among other things, at various points, with optional flexibility for adding additional monitoring which could be on the fly, to intelligently adapt various functions, such as reporting frequency, communication method, power conservation, and the like. The sensors 30 can be connected on a common sensor signaling system, such as an I²C bus.

In one aspect, onboard sensors 30 (FIG. 1) could include, for example, a temperature sensor, a multi-axis accelerometer, such as a 3, 6 or 9-axis accelerometer, a GPS location sensor (which could be combined with a radio circuit 20) and/or a tamper sensor for detecting an opening and/or closing of the access panel 34. External sensors 30 (FIG. 5) could include, for example, one or more temperature sensors, pressure sensors, vibrations sensors, location sensors, flow control sensors, and so forth, distributed at various points in and around an injection mold, molding machine, stamping die or stamping press.

For example, outside of the enclosure 12, the monitor 10 can connect on an I²C bus to: a sensor S1, which could be GPS location sensor for monitoring a precise location of the injection mold; then a sensor S2, which could be a temperature sensor, such as a thermocouple, attached to the injection mold; then a sensor S3, which could be a vibration sensor, such as an accelerometer, for monitoring wear of bearings or other reciprocating elements on the injection mold, molding machine or other item; then a sensor S4, which could be a pressure sensor for monitoring the clamp pressure of the injection mold; then a sensor S5, which could be a flow control sensor for monitoring flow of a water line to the injection mold; then a sensor S6, which could be a water presence sensor, such as a water detection strip, for monitoring for the presence of water on the floor around the injection mold; and so forth. Such sensors can be daisy-chained with monitor 10 acting as a master device periodically polling the sensors 30. The monitor 10, and each sensor 30, can include a pair of connectors, such as M8 connectors, for daisy-chaining the devices together. One sensor 30, such as sensor 30x, could terminate the daisy-chain. In addition, the monitor 10 can provide power to one or more of the sensors 30, through the connectors, for sensors that do not independently receive power. In one aspect, up to 256 sensors can be daisy chained in this manner, providing flexibility for adding additional sensors for monitoring an injection mold or stamping die on the fly. In one aspect, support for each sensor type can be configured in the firmware 24 with over the air (OTA) updates for new sensors 30 added over time. Sensors 30 can be added, including with such updates to firmware 24, while the monitor 10 is attached to an injection mold or stamping die and already providing intelligent monitoring.

The monitor 10 can maintain a sensor log 116 comprising values collected from each sensor 30 present in the system at different polling times. For example, at a first time period T1, the monitor 10 can poll each sensor 30 in the daisy-chain to collect corresponding values for each. The monitor 10 can then send a message to the data center 156 if configured to do so. Then, at a second time period T2, the monitor 10 can again poll each sensor 30 in the daisy-chain to collect corresponding updated values for each. The monitor 10 can then send another message to the data center 156 if configured to do so. In one aspect, process can repeat, with the sensor log 116 continuously appending, until data storage limits are reached, in which values for older time periods (already transmitted to the data center 156) can be purged. In another aspect, the monitor 10 can purge collected values each time a success acknowledgement (such as from the gateway 154, the data center 156 or the customer server as operations master 157b) for a transmission occurs. This may advantageously keep the values collected by the monitor 10 to a minimum in case the monitor 10 should subsequently go offline, such as by going out of range, while logging activity for an extended period of time before successful transmission can occur. The monitor 10 and/or the data center 156 and/or the customer server as operations master 157b can also set flags for triggering alarm notifications corresponding to any sensor 30 having a value at a polling time period exceeding a predetermined limit. In another aspect, one or more sensors 30 can operate as master devices sending values to the monitor 10 when a triggering event happens, such as reaching a predetermined temperature, pressure, motion, change in location, or the like.

In one aspect, the monitor 10 can be configured to implement alternate setting profiles while monitoring the sensors 30 to thereby provide more intelligent control. With such profiles selected, the monitor 10 can be configured to function in a different manner until a predetermined condition expires. Such predetermined conditions can be derived from values calculated from one or more sensors, elapsed times, and so forth. For example, the monitor 10 can be initially configured to transmit a production cycle count for an injection mold or stamping die once per day. However, whenever the monitor 10 detects a temperature value exceeding a threshold, the monitor 10 can change to transmitting a production cycle count for the injection mold or stamping die each time the production cycle count increments. Then, when the monitor 10 detects the temperature value no longer exceeds the threshold, the monitor 10 can return to transmitting a production cycle count once per day.

Figure 6A:
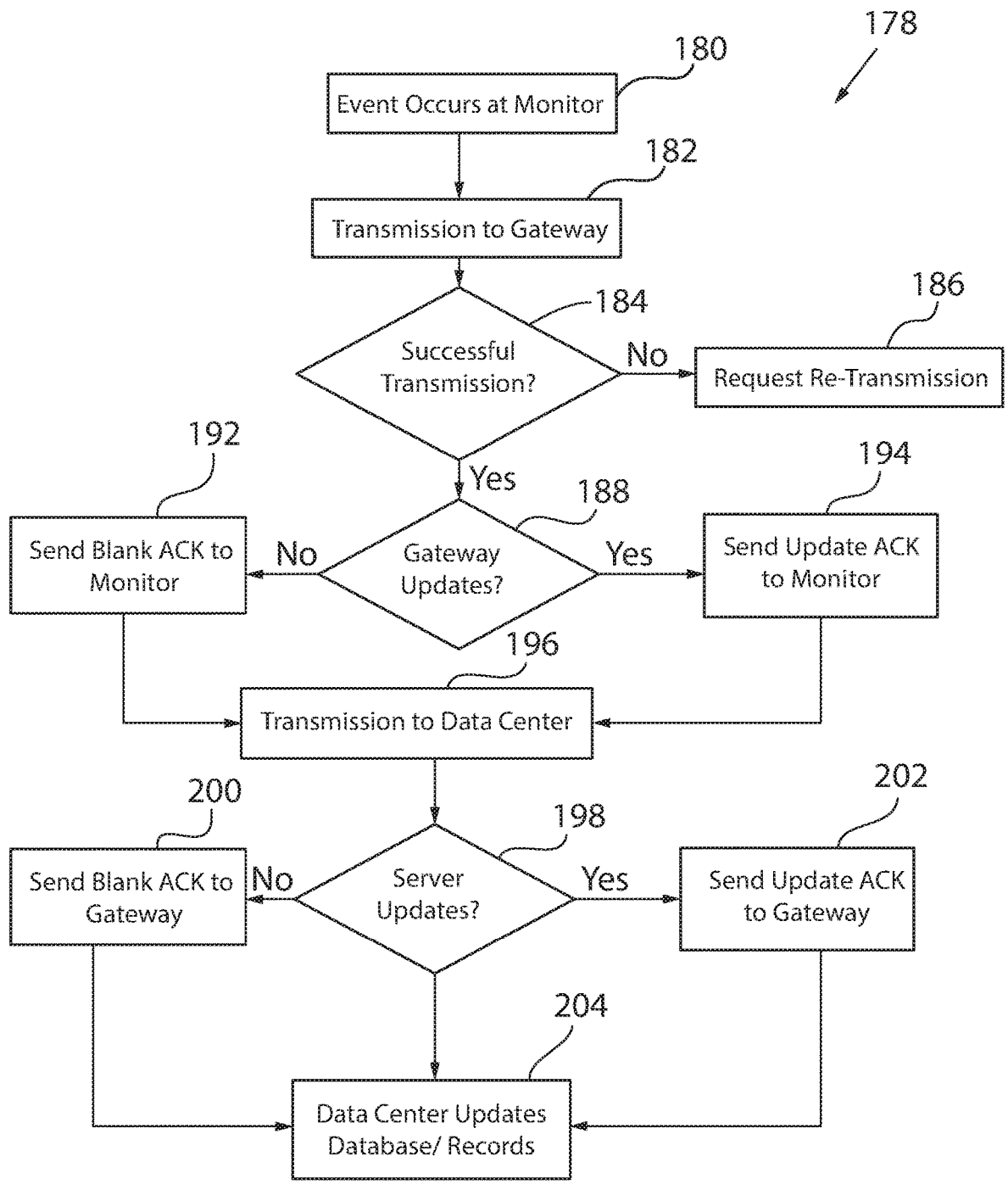
FIG. 6A is a flow chart illustrating transmission of messages in accordance with an aspect of the invention.

With additional reference to FIG. 6A, in operation, the monitor 10 can periodically send messages to the data center 156, such as according to process 178. For example, at step 180, an event may occur causing the monitor 10 to send a message to the gateway 154 and/or the data center 156, and/or the customer server as operations master 157b. This could correspond, for example, to a polling time in which values of sensors 30 are collected for reporting to the gateway 154 and/or the data center 156, and/or the customer server as operations master 157b, and/or a triggering event in which one or more sensors reach a predetermined value for reporting to the gateway 154 and/or the data center 156, and/or the customer server as operations master 157b. At step 182, the monitor can transmit a message with the report, including collected sensor values, to the gateway 154. At decision step 184, the gateway 154 can determine if a successful transmission, complete with expected information, such as a payload framed by predetermined start/stop bits defining a complete message, has been received. In one aspect, the gateway 154 can receive multiple transmissions before being complete. If the gateway 154 is aware of the transmission (such as a corrupted transmission) and the transmission is incomplete ("No"), then at step 186, the gateway 154 can return a request for re-transmission to the monitor 10. The monitor 10, in turn, can re-transmit the message to the gateway 154, and/or re-transmit the message using another communication method, such as cellular network communication. If the gateway 154 is unaware of the transmission (such as an out of range transmission), after a predetermined time out period, such as 13 seconds, the monitor 10 can re-transmit the message to the gateway 154, and/or re-transmit the message using another communication method, such as communication to the gateway 154, data center 156, and/or the customer server as operations master 157b or other location.

However, if the transmission is complete ("Yes"), then at decision step 188, the gateway 154 can determine if there are any pending updates for the monitor 10 for returning to the monitor 10 with an acknowledgment ("ACK"). If there are no pending updates ("No"), the process can proceed to step 192 in which the gateway 154 returns a blank acknowledgment ("ACK") to the monitor 10. However, if there are any pending updates ("Yes"), such as a firmware update and/or a settings update for the monitor 10, the process can instead proceed to step 194 in which the gateway 154 returns an acknowledgment ("ACK") with update instructions to the monitor 10. The monitor 10, in turn, can receive and execute the update(s), which can include executing software to update the firmware 24 and/or settings.

Next, the process can continue to step 196 in which the gateway 154 can forward the transmission with the report to the data center 156, and/or the customer server as operations master 157b. Then, at decision step 198, the data center 156 can determine if there are any pending updates for the gateway 154 or the monitor 10. If there are no pending updates ("No"), the process can proceed to step 200 in which the data center 156, and/or the customer server as operations master 157b returns a blank acknowledgment ("ACK") to the gateway 154. However, if there is a pending update ("Yes"), the process can instead proceed to step 202 in which the data center 156, and/or the customer server as operations master 157b returns an acknowledgment ("ACK") with update(s) information to the gateway 154. The gateway 154, in turn, can request, receive and execute the update(s), which can include queueing one or more software or firmware updates for the monitor 10 and/or executing software to update the software or firmware of the gateway 154. Then, at step 204, the data center 156, and/or the customer server as operations master 157b can update data base records of the data center 156, and/or the customer server as operations master 157b and/or push updates to subscribers, such as the computer 164 and/or the device 166.

Messages sent by the monitor 10 can include a count of open/close production cycles for an injection mold or stamping die and/or an elapsed time for each production cycle. Such production cycles can be determined by the monitor 10 according to motion detected by one or more sensors 30. Such elapsed time can be determined by the monitor 10 according to timer 26 triggered with respect to the one or more sensors 30. To maintain a count of production cycles, the monitor 10 can advantageously utilize two or more sensors 30 of different types for increased reliability. A first sensor 30 could be, for example, a "Reed switch," an electrical switch operated by an applied magnetic field, attached to the injection mold or stamping die, such as at an lower half (see, for example, FIG. 2A or 3). When the Reed switch is in proximity with a magnet attached to the injection mold or stamping die, such as at an upper half, a first state indicating closed can be reported. However, when the Reed switch is no longer in proximity with the magnet, a second state indicating open can be reported. One cycle between first and second closings of the injection mold or stamping die (or first and second openings of the injection mold or stamping die) can correspond to one recorded count.

Also, a second sensor 30 of a different type could be, for example, a TMR sensor, a sensor responsive to a magneto resistive effect that occurs in a magnetic tunnel junction, attached to the injection mold or stamping die, such as at the upper half. When the TMR sensor is in proximity with a magnet attached to the injection mold or stamping die, such as at the lower half, a first state indicating closed can be reported. However, when the TMR sensor is no longer in proximity with the magnet, a second state indicating open can be reported. For example, one cycle between open and open or close and close can correspond to one count. The processor 16 can compare the first and second sensors 30 when determining the count. If the sensors report inconsistent states, the monitor 10 can report an error and/or execute to analyze other sensors to determine presence of a problem in the system for reporting. In another aspect, different sensor 30 could be used, in addition or alternatively, such as an accelerometer attached to the upper or lower half, an Anisotropic Magnetoresistance (AMR) sensor and/or a Hall Effect sensor.

Figure 6B:
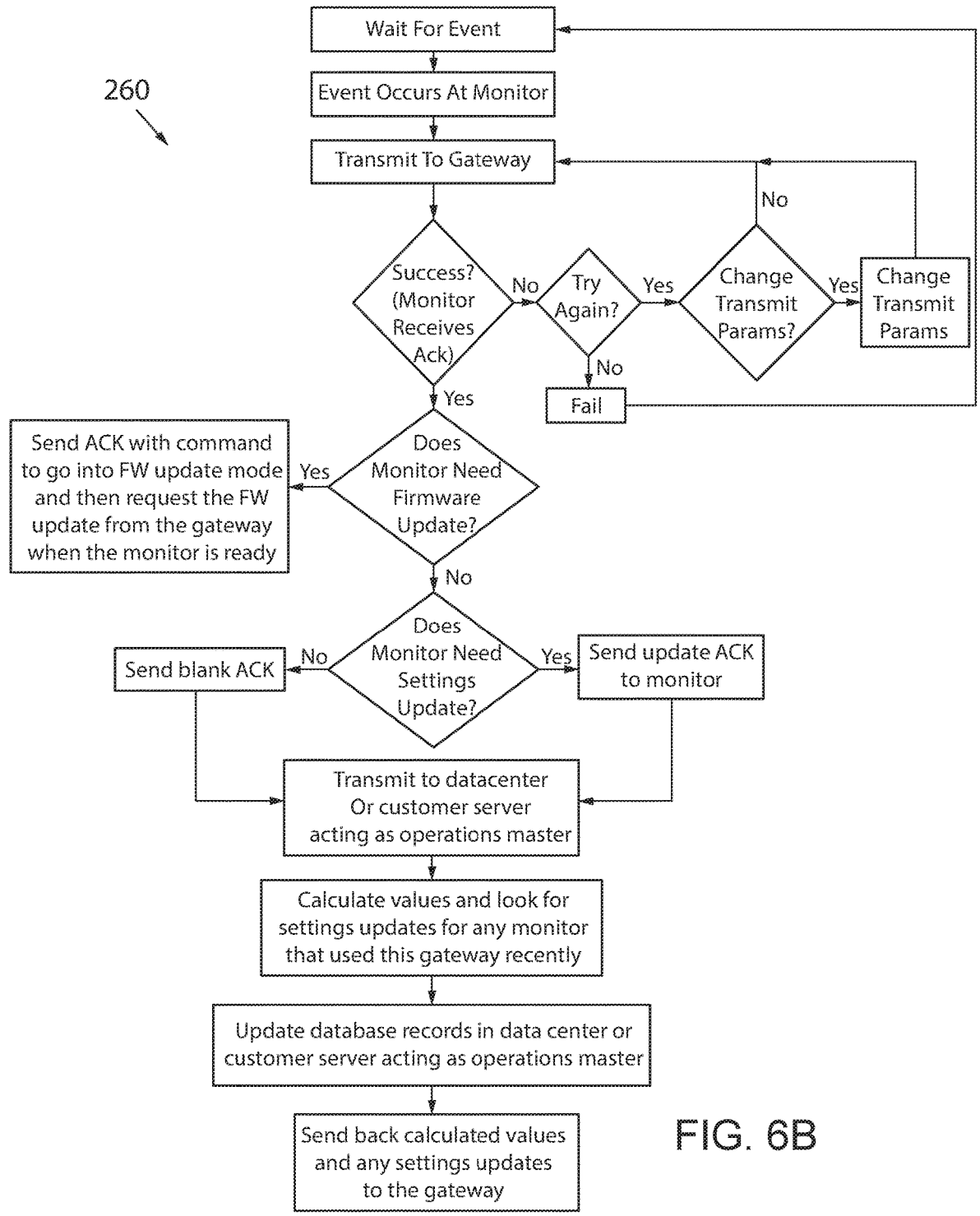
FIG. 6B is a flow chart illustrating transmission of messages in accordance with another aspect of the invention.

Similar to the process 178, with additional reference to FIG. 6B, in accordance with another aspect of the invention, the system can provide transmission of messages according to process 260. In the process 260, the monitor 10 can wait for an event to occur. When an event occurs, the monitor 10 can transmit a message to the gateway 154. If the transmission is successful, the gateway 154 can return an acknowledgment message to the monitor 10. However, if the transmission is unsuccessful, the monitor 10 can determine whether to try again, and if so, whether the monitor 10 should change any transmission parameters, such as radio, frequency and/or power, when trying again. In addition, with a successful transmission, the system can determine whether any firmware, settings and/or any other configuration updates may be necessary for the monitor 10. If any updates are necessary, the gateway 154 can return the acknowledgment to the monitor 10 with commands and/or data for completing such update. However, if updates are not necessary, the gateway 154 can simply return a blank acknowledgment. With a successful transmission received from the monitor 10, the gateway 154 can forward the message to the data center 156 and/or any other systems as desired for determining such updates for the monitor 10, calculating values from the message for returning to the gateway 154, and the like.

Figure 7A:
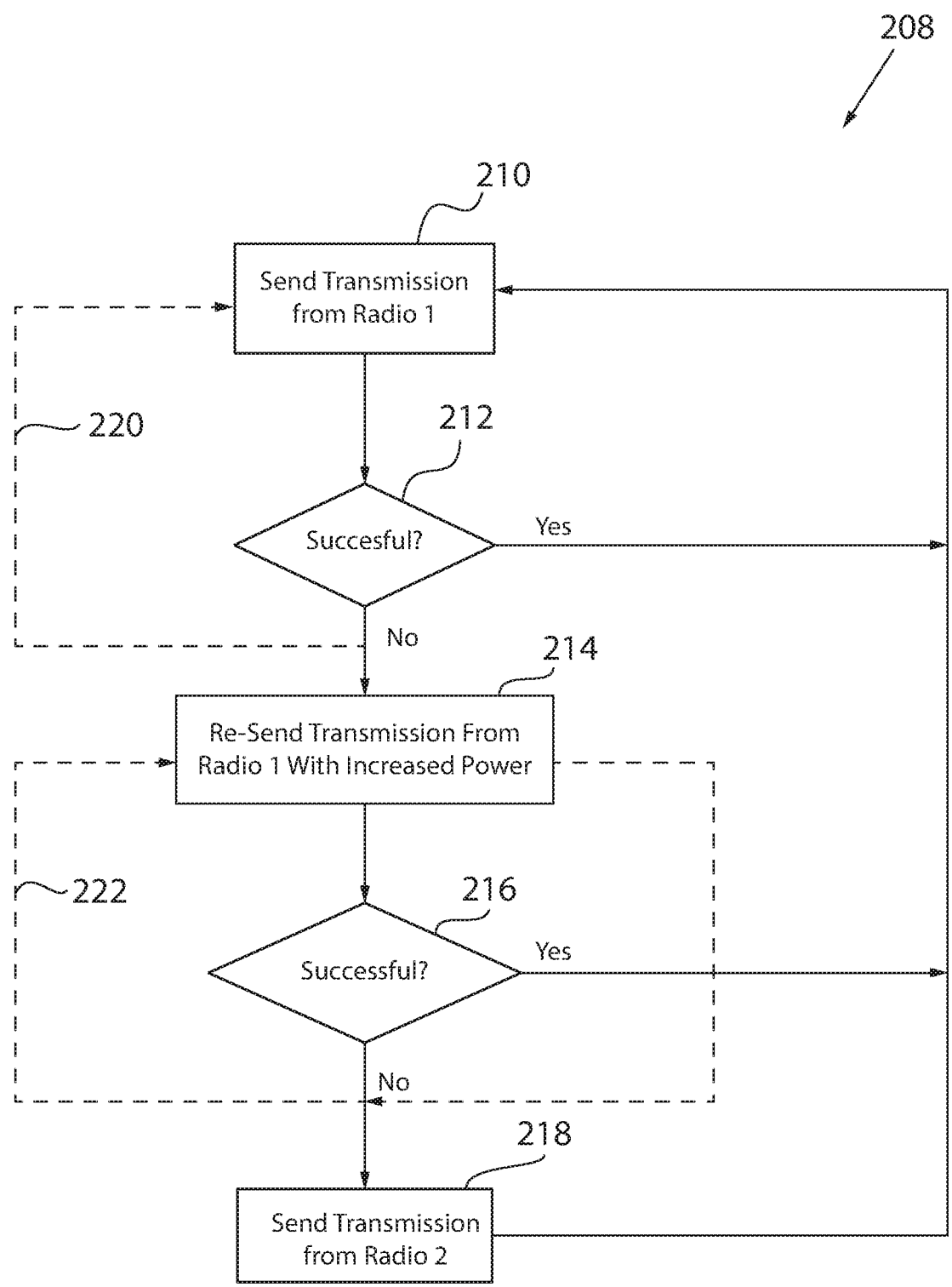
FIG. 7A is a flow chart illustrating selection of communication methods in accordance with an aspect of the invention.

With additional reference to FIG. 7A, for implementing intelligent control with respect communications, the monitor 10 can be configured to adjust communication transmissions as necessary to maximize power savings while ensuring effective communication, such as according to process 208. At step 210, the monitor 10 can initially transmit a message with a report, including collected sensor values, such as to the gateway 154, using a default radio. The default radio could be, for example, the first radio circuit 20a, configured to communicate in a 900 MHz or 2.4 GHz ISM band with minimal transmission power. Next, at decision step 212, the monitor 10 determines if the transmission was successful based on whether an acknowledgment ("ACK") is received from the gateway 154 within a predetermined amount of time. If the transmission was successful ("Yes"), the monitor 10 can continue to use the default radio with minimal transmission power. However, if the transmission was unsuccessful ("No"), at step 214 the monitor 10 can re-send the message with increased transmission power, or optionally, proceed directly to step 218 to re-send the message with an alternative radio when so configured.

Next, at decision step 216, the monitor 10 determines if the re-sent transmission was successful based on whether an acknowledgment ("ACK") is received from the gateway 154 with the predetermined amount of time. If the transmission was successful ("Yes"), the monitor 10 can continue to use the default radio with the, now increased, level of transmission power. However, if the transmission was unsuccessful ("No"), at step 218 the monitor 10 can re-send the message with a further increased transmission power or an alternative radio. The alternative radio could be, for example, the second radio circuit 20b, configured to communicate using cellular network communication to the data center 156, and/or the customer server as operations master 157b, bypassing the gateway 154.

In one aspect, the monitor 10 can be configured to retry each transmission method a predetermined number of times before proceeding to a different transmission method. For example, at decision step 212, if the transmission with the default radio and minimal transmission power was unsuccessful ("No"), the monitor 10 can follow a first loop 220, returning to step 210 to try again with the default radio and minimal transmission power. The monitor 10 can repeat the first loop 220 for a predetermined number of times before breaking from the loop. Similarly, at decision step 216, if the transmission with the default radio and increased transmission power was unsuccessful ("No"), the monitor 10 can follow a second loop 222, returning to step 214 to try again with the default radio and increased transmission power. The monitor 10 can repeat the second loop 222 for a predetermined number of times before breaking from the loop. The predetermined number of times can be configured according to values collected from one or more sensors 30, an amount of the memory 22 still available, transmission history, customer or administrator setting and/or current location.

The monitor 10 can also implement a tamper detection system. The tamper detection system can be used to assess circumstances in which the enclosure 12 may be opened. The tamper detection system can include tamper sensor 30c which could be, for example, a spring-loaded and/or flexibly resilient conductive strip and/or IR sensor and/or TMR switch and the like. When the access panel 34 is opened, the conductive strip loses contact between the enclosure 12 and the access panel 34, thereby opening a sensing circuit of the tamper detection system. This can result in a first (open) state reported by the tamper sensor 30c to the sensor I/O 28 via the signaling system, such as the I$^2$C bus. However, when the access panel 34 is closed, the conductive strip maintains contact between the enclosure 12 and the access panel 34, thereby closing the sensing circuit of the tamper detection system. This can result in a second (closed) state reported by the tamper sensor 30c to the sensor I/O 28 via the signaling system, such as I$^2$C bus.

When the tamper sensor 30c reports the first (open) state, the monitor 10 can send a transmission reporting the first state. Similarly, when the tamper sensor 30c reports the second (closed) state, the monitor 10 can send another transmission reporting the second state. This can allow an external device, such as the gateway 154 or the data center 156, and/or the customer server as operations master 157b, to track and time the various conditions of the monitor 10, including with an elapsed time during which the access panel 34 was opened. In another aspect, when a transition from the closed state to the open state occurs, the processor 16 can start the timer 26. The monitor 10 can also send a first message indicating the enclosure 12 is open. Then, when a transition from the open state to the closed state occurs, the processor 16 can stop the timer 26 to determine an elapsed time during which the access panel 34 was opened. The monitor 10 can then send a second message indicating the enclosure 12 is closed and indicating an elapsed time during which the enclosure 12 was open. In one aspect, elapsed time can be determined from between transmissions to the gateway 154 and/or the data center 156 and/or the customer server as operations master 157b.

Figure 7B:
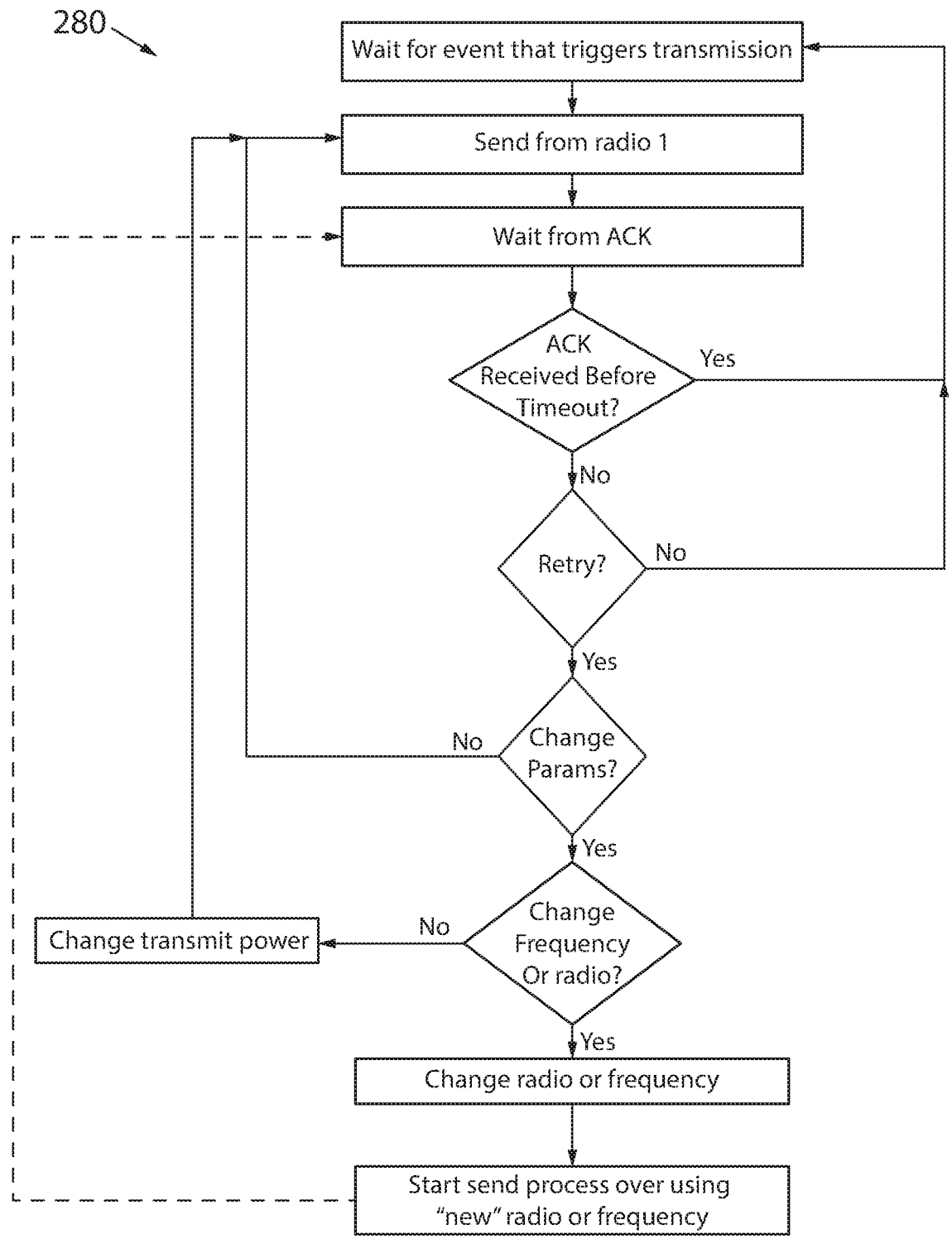
FIG. 7B is a flow chart illustrating selection of communication methods in accordance with another aspect of the invention.

Similar to the process 208, with additional reference to FIG. 7B, in accordance with another aspect of the invention, the system can provide selection of communication methods according to process 280. In the process 280, the monitor 10 can wait for an event to occur. When an event occurs, the monitor 10 can transmit a message to the gateway 154 using a given radio circuit 20 ("radio 1"). If the transmission is successful, the gateway 154 can return an acknowledgment message to the monitor 10. However, if an acknowledgment message is not received within a predetermined amount of time, the monitor 10 can determine whether to try again, and if so, whether the monitor 10 should change any transmission parameters, such as frequency, power and/or a different radio circuit 20 ("new radio). In one aspect, the monitor 10 can change the frequency and/or power of the radio in trying again before changing to a different radio.

Figure 8:
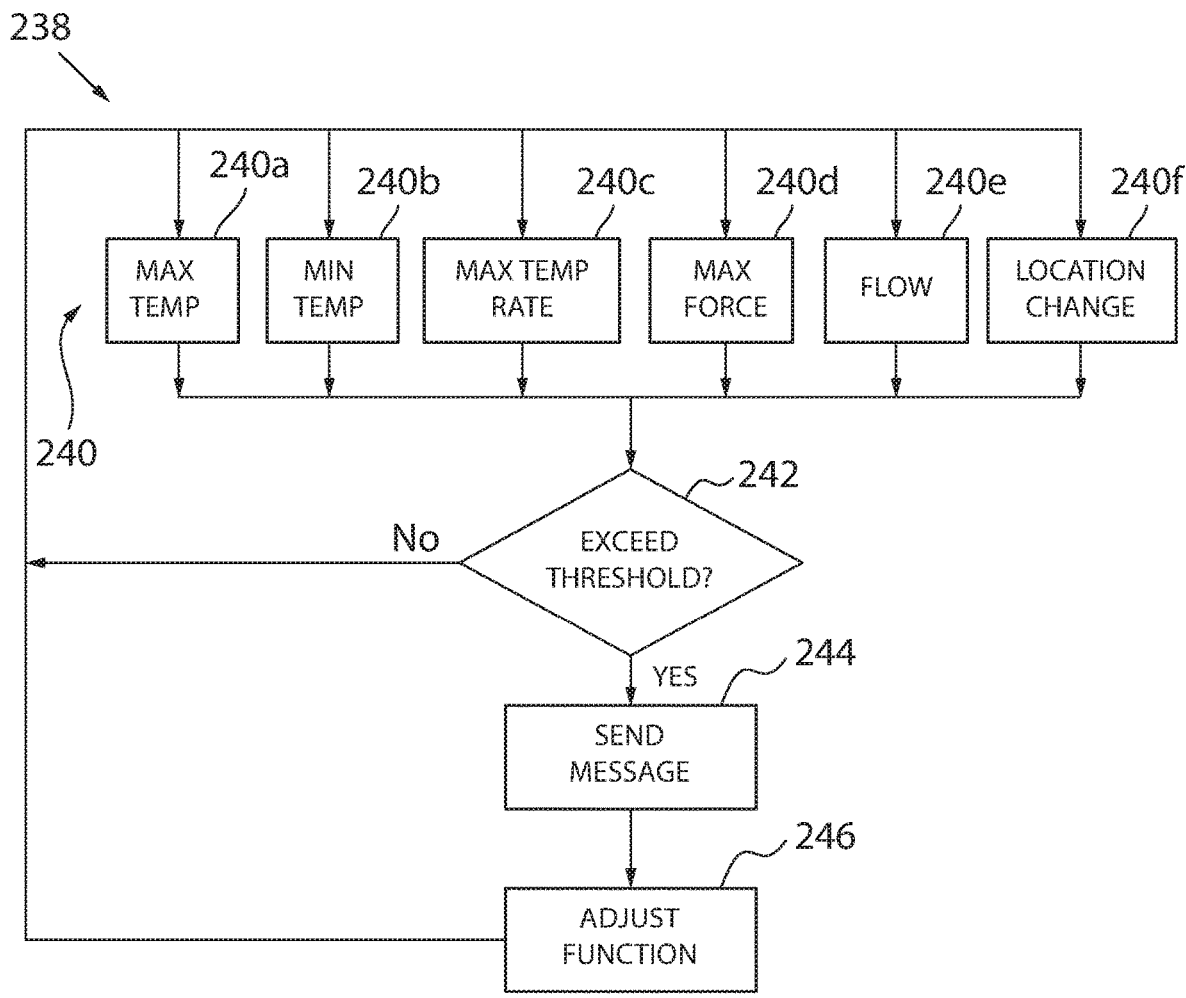
FIG. 8 is a flow chart illustrating implementation of intelligent control in accordance with an aspect of the invention.

With additional reference to FIG. 8, for implementing intelligent control, the monitor 10 can also be configured to monitor various sensors 30 at various points in predetermined ways, with flexibility for adding additional sensors on the fly as described in FIG. 5, to adapt various functions, such as reporting frequency, communication method, power conservation, and the like, such as according to process 238. At an initial step, the monitor 10 can be configured with rules 240 for monitoring sensors 30 for predetermined characteristics. Such rules can be programmed in the firmware 24, such as according to pre-stored parameters 110, and/or may be adapted by the processor 16 execute the program 112 to implement machine learning and/or artificial intelligence.

By way of example, sensor 30*a* could be a temperature sensor mounted to the PCB 14. Rule 240*a* could define monitoring the temperature sensor for a maximum temperature value, such as 88° C. Rule 240*b* could define monitoring the same temperature sensor for a minimum temperature value, such as −30° C. Rule 240*c* could define monitoring the same temperature sensor for a maximum rate of change calculated from the temperature sensor, as ≥1° C./second. Sensor 30*b* could be an accelerometer mounted to the PCB 14. Rule 240*d* could define monitoring the accelerometer for a maximum force calculated from motion of the accelerometer, such as 1 Newton. Sensor S6 (FIG. 5) could be a flow sensor for monitoring for the presence of a fluid flow to or from an injection mold. Rule 240*e* could define monitoring the water detection strip water presence by any amount. Also, sensor S1 could be GPS location sensor for monitoring a precise location of an injection mold or machine. Rule 240*f* could define monitoring the location sensor for maximum amount of movement, such as 1 meter.

In operation, values of the sensors 30 are collected, such as at the aforementioned polling times. The processor 16 then determines compliance with respect to the rules 240. At decision step 242, if the processor 16 determines that no rules have been broken ("No"), the processor 16 can continue monitoring the sensors and calculating values for checking the rules. However, if at decision step 242 the processor 16 determines that one or more rules have been broken ("Yes"), such as a maximum temperature being exceeded, the monitor 10 can instead proceed to step 244 in which a message is sent to the gateway 154. Then, the processor 16 can adapt to the particular change by executing to adjust a function corresponding to the change if needed. For example, the maximum temperature being exceeded could correspond to activation of a fan or climate control unit by driving a control signal and/or powering down of the monitor 10. Then, at step 246, the monitor 10 can periodically monitor the sensors and calculate the values for checking the rules based on current sensed conditions. If the monitor 10 powered down, this step can include periodically powering up to make such measurements and calculations before powering down again. If the monitor 10 subsequently finds that previous conditions have been restored, such as the maximum temperature no longer being exceeded, the monitor 10 can correspondingly restore to the earlier function(s), such as deactivation of the fan or climate control unit and/or maintaining the monitor 10 in a powered up condition.

It should be appreciated that numerous rules and functions can be configured in the system using the sensors 30 as desired. Another rule could comprise, for example, monitoring the vibration sensor S3 (FIG. 5) for consistent vibrations, such as a 1 Newton/minute. If consistent vibrations are determined, the monitor 10 can maintain an increased frequency of transmissions of reports to the gateway 154, such as one message per hour. However, if consistent vibrations are not determined, the monitor 10 can reduce the frequency of transmissions of reports to the gateway 154, such as one message per day. Another rule could comprise, for example, monitoring the temperature sensor in conjunction with the count of open/close production cycles (which could be monitored by a Reed switch, a TMR sensor and/or an accelerometer as described above). If the temperature steadily rises, but the count does not increase within a predetermined amount of time, this could indicate a faulty condition requiring transmission of a report and adjustment of a function. Another rule could comprise, for example, monitoring the vibration sensor in conjunction with the count of open/close production cycles. If a vibration steadily occurs, but the count does not increase within a predetermined amount of time, this could also indicate a faulty condition requiring transmission of a report and adjustment of a function. Yet another rule could comprise, for example, monitoring the accelerometer to determine movement exceeding a threshold. If such movement occurs, the monitor 10 can send a message including an updated location. Yet another rule could comprise, monitoring a water detection strip in a predetermined location for water presence by any amount around an injection mold.

The monitor 10 can include multiple ports for receiving power from wired power sources, such as the USB port 32*b* for receiving power from a USB device, the AC power port 32*c* for receiving power from an AC electrical outlet and/or the DC power port 32*d* for receiving power from a DC electrical outlet. The power supply circuit 31 can receive power from the USB port 32*b*, the AC power port 32*c* and/or the DC power port 32*d* for delivering power to components of the monitor 10, such as the processor 16, the system communication I/O 18, the radio circuits 20, the memory 22, the firmware 24, the timer 26, the sensor I/O 28, one or more electronic sensors 30, and/or the LED's 46. In the absence of power from the USB port 32*b*, the AC power port 32*c* or the DC power port 32*d*, the power supply circuit 31 can receive power from the one or more batteries 38. Moreover, in the presence of power from the USB port 32*b*, the AC power port 32*c* or the DC power port 32*d*, the power supply circuit 31 can recharge the one or more batteries 38 if rechargeable. Accordingly, the power supply circuit 31 can reliably select power from at least two power sources for power delivery, such as from the one or more batteries 38 and any of the USB port 32*b*, the AC power port 32*c* and/or the DC power port 32*d*.

To conserve power in the system, the power supply circuit 31 can be configured to bypass circuitry for one or more of the aforementioned power sources when the one or more of the aforementioned power sources is not providing power. The power supply circuit 31 can include the jumper block 42 for bypassing such circuitry. For example, in one arrangement, the monitor 10 can be configured to receive power from the one or more batteries 38 and the USB port 32*b*. Accordingly, the jumper block 42 can be configured to bypass circuitry of the AC power port 32*c* and the DC power port 32*d* to avoid power such elements, which may include voltage regulators, capacitors and other elements.

Finally, the system can be configured to implement predetermined task scenarios during setup, which may be beneficial for protecting the system during operation. In one aspect, before a monitor 10 can begin monitoring an injection mold or stamping die, the monitor 10 can require indication of presence of a predetermined set of elements, such as other molds, dies, machines, systems and/or assemblies of the system 150 (FIG. 4). Such indication could be made, for example, by scanning the indicia 48 of each monitor 10 required for the task, as well as indicia of other systems and/or assemblies required for the task, by the mobile device, updated to the data center 156 or via Bluetooth radio communication when all of the required items are in proximity and equipped with a Bluetooth capable monitor. After the required elements are scanned, as indicated to the data center 156 by the monitor 10, mobile application or other software application, the monitor 10 and/or a generated notification can indicate operation is ready, such as by illuminating a green LED 46, with counts, times and/or other statistics being recorded for the injection mold or stamping die. However, the monitor 10 can maintain counts, regardless of whether other devices are scanned or within proximity. If devices are not successfully scanned, the monitor 10 can send a message, such as to the gateway 154 and/or the data center 156, and/or the customer server as operations master 157b, providing such as between transmissions.

Specifically then, one aspect of the invention can comprise a system for monitoring an injection mold or stamping die, comprising: a plurality of sensors, including: a first sensor configured to detect at least one of an opening and closing of an injection mold or stamping die; and a second sensor configured to detect a predetermined characteristic; a radio communication device; and a processor in communication with the plurality of sensors and the radio communication device, the processor executing a program stored in a non-transient medium to: maintain a count of production cycles for an injection mold or stamping die according to detection by the first sensor; and transmit a message including the count via the radio communication device, wherein the message is transmitted following detection of the predetermined characteristic according to the second sensor.

The second sensor could be a temperature sensor configured to detect a temperature associated with an injection mold or stamping die, wherein the predetermined characteristic is detecting a maximum or minimum temperature.

The second sensor could be an accelerometer configured to detect an acceleration associated with an injection mold or stamping die, wherein the predetermined characteristic is detecting a maximum acceleration or deceleration.

The second sensor could be a location sensor configured to detect a location associated with an injection mold or stamping die, wherein the predetermined characteristic is detecting a change in location by a distance or direction exceeding a threshold.

The second sensor could be a flow sensor configured to detect a liquid flow rate associated with the injection mold or stamping die, wherein the predetermined characteristic is a liquid flow rate rising above or falling below a threshold.

The system could further comprise an enclosure, wherein the radio communication device and the processor are housed in the enclosure, wherein the second sensor is a tamper sensor configured to detect at least one of an opening and closing of the enclosure, and wherein the predetermined characteristic is detecting an opening or closing of the enclosure.

The tamper sensor could comprise at least one of a TMR sensor and an IR sensor.

The message could further include the predetermined characteristic.

The first sensor could comprise at least one of an AMR sensor, a TMR sensor, a Hall effect sensor and a Reed switch.

The first sensor could comprise an accelerometer.

After transmitting the message, the system could receive an acknowledgment with an update, wherein the processor further executes the update to provide a change to the system.

Another aspect of the invention could comprise a system for monitoring an injection mold or stamping die, comprising: a sensor configured to detect at least one of an opening and closing of an injection mold or stamping die; a radio communication device; and a processor in communication with the sensor and the radio communication device, the processor executing a program stored in a non-transient medium to: maintain a count of production cycles for an injection mold or stamping die according to detection by first sensor; transmit a message including the count via the radio communication device; after transmitting the message, wait for an acknowledgment; and after failing to receive the acknowledgment within a predetermined amount of time, transmit the message again with a different transmission characteristic.

The different transmission characteristic could be an increase in transmission power.

The different transmission characteristic could be transmitting the message at a different frequency.

The radio communication device could be a first radio communication device, and the system could further comprise a second radio communication device, wherein the different transmission characteristic further comprises transmitting the message via the second radio communication device.

The first radio communication device could be configured for local network communication, and wherein the second radio communication device is configured for wide area network communication.

The local network communication could be in a 400 MHz, 868 MHz, 900 MHz or 2.4 GHz radio band, or the like.

After receiving an acknowledgment with the different transmission characteristic, the processor could further execute an update received with the acknowledgment, wherein the update provides a change to the system.

The sensor could be a first sensor, wherein the change is to activate or deactivate a second sensor, or change processing parameters, software and/or firmware of the second sensor, Another aspect of the invention could comprise a system for monitoring an injection mold or stamping die, comprising: a monitor configured to detect at least one of an opening and closing of an injection mold or stamping die; and a plurality of sensors, including a first sensor configured to detect motion of an injection mold or stamping die, wherein the plurality of sensors communicate with the monitor in a daisy chain, and wherein the monitor is configured to wirelessly transmit a message including a parameter from each of the plurality of sensors, or transmit a message including a parameter from each of the plurality of sensors where the parameter is above or below a specified threshold, or transmit a message including a parameter from each of the plurality of sensors where the parameter has changed since the previous transmission, or transmit a message including a parameter from each of the plurality of sensors deemed important based on a value of one or more of the plurality of sensors or current time of day, time since last transmission or other predetermined characteristic.

A sensor of the plurality of sensors could include a sensor confirmed to detect motion associated with an injection mold or stamping die.

A sensor of the plurality of sensors could include a temperature sensor configured to detect a temperature associated with an injection mold or stamping die.

A sensor of the plurality of sensors could include an accelerometer configured to detect an acceleration or deceleration associated with an injection mold or stamping die.

A sensor of the plurality of sensors could include a location sensor configured to detect a location associated with an injection mold or stamping die.

A sensor of the plurality of sensors could include a flow sensor configured to detect a liquid flow rate.

The plurality of sensors could be connected via an $I^2C$ bus.

Each sensor of the plurality of sensors could include first and second connectors for communicating in the daisy chain.

The monitor could be configured to communicate with at least 256 sensors in the daisy chain.

The monitor could provide power to at east some sensors of the plurality of sensors.

Another aspect of the invention could comprise a monitor for detecting at least one of an opening and closing of an injection mold or stamping die, comprising: a sensor configured to detect at least one of an opening and closing of an injection mold or stamping die; a radio communication device; and a power supply circuit for powering the sensor and the radio communication device, wherein the power supply circuit is configured to receive power from at least two power sources.

The at least two power sources could include a battery and a port for receiving power from a wired power source.

The battery could be rechargeable.

The port could be configured to receive AC power from AC wiring or an AC electrical outlet.

The port could be configured to receive DC power from DC wiring or a DC electrical outlet.

The port could be configured to receive USB power from a USB device.

The port could be a first port, and the system could further comprise a second port and a third port, wherein the second port is configured to receive DC power from a DC electrical outlet and the third port is configured to receive USB power from USB wiring or a USB device.

The power supply circuit could be configured to bypass circuitry for one of the at least two power sources when the one of the at least two power sources is not providing power.

The power supply circuit could comprise a jumper or autodetect mechanism for bypassing either of the at least two power sources.

Another aspect of the invention could comprise a system for monitoring an injection mold or stamping die, comprising: first and second sensors configured to detect at least one of an opening and closing of an injection mold or stamping die; a radio communication device; and a processor in communication with the first and second sensors and the radio communication device, the processor executing a program stored in a non-transient medium to: maintain a count of production cycles for an injection mold or stamping die according to the first and second sensors; and transmit a message including the count via the radio communication device.

The first sensor could be an accelerometer, wherein the second sensor is selected from the group consisting of: a Reed switch; an AMR sensor; a TMR sensor; and a Hall effect sensor.

The processor could further execute to report an error when the first and second sensors indicate differing counts.

Certain terminology is used herein for purposes of reference only, and thus is not intended to be limiting. For example, terms such as "upper," "lower," "above," and "below" refer to directions in the drawings to which reference is made. Terms such as "front," "back," "rear," "top," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical tetras referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A system for monitoring an injection mold or stamping die, comprising:
    a plurality of sensors, including:
        a first sensor configured to detect at least one of an opening and closing of an injection mold or stamping die; and
        a second sensor configured to detect a predetermined characteristic;
    a radio communication device; and
    a processor in communication with the plurality of sensors and the radio communication device, the processor executing a program stored in a non-transitory medium to:
        maintain a count of production cycles for an injection mold or stamping die according to detection by the first sensor; and
        transmit a message including the count via the radio communication device, wherein the message is transmitted following detection of the predetermined characteristic according to the second sensor.

2. The system of claim 1, wherein the second sensor is a temperature sensor configured to detect a temperature associated with an injection mold or stamping die, and wherein the predetermined characteristic is detecting a maximum or minimum temperature.

3. The system of claim 1, wherein the second sensor is an accelerometer configured to detect an acceleration associated with an injection mold or stamping die, and wherein the predetermined characteristic is detecting a maximum acceleration or deceleration.

4. The system of claim 1, wherein the second sensor is a location sensor configured to detect a location associated with an injection mold or stamping die, and wherein the predetermined characteristic is detecting a change in location by a distance or direction exceeding a threshold.

5. The system of claim 1, wherein the second sensor is a flow sensor configured to detect a liquid flow rate associated with the injection mold or stamping die, and wherein the predetermined characteristic is a liquid flow rate rising above or falling below a threshold.

6. The system of claim 1, further comprising an enclosure, wherein the radio communication device and the processor are housed in the enclosure, wherein the second sensor is a tamper sensor configured to detect at least one of an opening and closing of the enclosure, and wherein the predetermined characteristic is detecting an opening or closing of the enclosure.

7. The system of claim 6, wherein the tamper sensor comprises at least one of a Tunnel Magnetoresistance (TMR) sensor and an Infrared (IR) sensor.

8. The system of claim 1, wherein the message further includes the predetermined characteristic.

9. The system of claim 1, wherein the first sensor comprises at least one of an Anisotropic Magnetoresistance (AMR) sensor, a TMR sensor, a Hall effect sensor and a Reed switch.

10. The system of claim 1, wherein the first sensor comprises an accelerometer.

11. The system of claim 1, further comprising, after transmitting the message, receiving an acknowledgment with an update, wherein the processor further executes the update to provide a change to the system.

12. A system for monitoring an injection mold or stamping die, comprising:
a sensor configured to detect at least one of an opening and closing of an injection mold or stamping die;
a radio communication device; and
a processor in communication with the sensor and the radio communication device, the processor executing a program stored in a non-transitory medium to:
maintain a count of production cycles for an injection mold or stamping die according to detection by first sensor;
transmit a message including the count via the radio communication device;
after transmitting the message, wait for an acknowledgment; and
after failing to receive the acknowledgment within a predetermined amount of time, transmit the message again with a different transmission characteristic.

13. The system of claim 12, wherein the different transmission characteristic is an increase in transmission power.

14. The system of claim 12, wherein the different transmission characteristic is transmitting the message at a different frequency.

15. The system of claim 14, wherein the radio communication device is a first radio communication device, and further comprising a second radio communication device, wherein the different transmission characteristic further comprises transmitting the message via the second radio communication device.

16. The system of claim 15, wherein the first radio communication device is configured for local network communication, and wherein the second radio communication device is configured for cellular communication.

17. The system of claim 16, wherein the local network communication uses a 400 MHz, 868 MHz, 900 MHz or 2.4 GHz radio band.

18. The system of claim 12, further comprising, after receiving an acknowledgment with the different transmission characteristic, the processor further executes an update received with the acknowledgment, wherein the update provides a change to the system.

19. The system of claim 18, wherein the sensor is a first sensor, and wherein the change is to activate or deactivate a second sensor.

20. The system of claim 12, wherein the sensor configured to detect at least one of an opening and closing of an injection mold or stamping die comprises an accelerometer.

21. The system of claim 20, wherein the accelerometer is a multi-axis accelerometer.

22. The system of claim 12, wherein the sensor configured to detect at least one of an opening and closing of an injection mold or stamping die comprises a plurality of sensors.

23. The system of claim 12, further comprising:
a power supply configured to supply electrical power to the radio communication device and the processor; and
a rechargeable battery configured to supply electrical power to the radio communications device and processor when the power supply is unable to supply electrical power thereto.

24. The system of claim 12, further comprising a housing mounted to one portion of the injection mold or stamping die, and wherein the radio communication device, the processor, and the sensor are carried by or disposed inside the housing.

25. The system of claim 24, further comprising an actuator mounted to another portion of the injection mold or stamping die that is movable relative to the one portion of the injecting mold or stamping die during opening and closing thereof, the actuator configured to actuate the sensor when the actuator is disposed in close proximity thereto.

26. The system of claim 24, further comprising an actuator mounted to another portion of the injection mold or stamping die that is movable relative to the one portion of the injecting mold or stamping die during opening and closing thereof, and wherein the sensor comprises a magnetic sensor configured to sense the actuator when the actuator gets close enough to the magnetic sensor to be magnetically detected by the magnetic sensor.

27. The system of claim 24, wherein the actuator comprises a magnetized element and the magnetic sensor comprises one of a Hall effect sensor, a TMR sensor, an AMR sensor, and a Reed switch.

28. The system of claim 24, further comprising:
a plurality of additional sensors in addition to the sensor configured to detect at least one of an opening and closing of the injection mold or stamping die, and
a powered communications bus in communication with the processor and the plurality of additional sensors and the processor, the powered communications bus electrically powering the plurality of additional sensors.

29. The system of claim 28, wherein one of the plurality of additional sensors is a vibration sensor configured to detect vibration of the injection mold or stamping die during opening and closing of the injection mold or stamping die.

30. The system of claim 28, wherein one of the plurality of additional sensors is a multi-axis accelerometer configured to detect at least one of motion and vibration of the injection mold or stamping die during opening and closing of the injection mold or stamping die.

31. The system of claim 28, wherein one of the plurality of additional sensors is a GPS location sensor configured to provide a location of the injection mold or stamping die and detect movement of the injection mold or stamping die.

32. The system of claim 28, further comprising:
a power supply configured to supply electrical power to the sensor, the radio communication device, the processor, and the powered communications bus which in turn powers the plurality of additional sensors; and
a rechargeable battery configured to supply electrical power to the sensor, the radio communication device, the processor, and the powered communications bus which in turn powers the plurality of additional sensors when the power supply is unable to supply electrical power thereto.

33. The system of claim 28, wherein the plurality of additional sensors are disposed outside the housing and daisy-chained together.

34. The system of claim 33, wherein one of the plurality of additional sensors disposed outside the housing is a pressure sensor attached to another portion of the injection mold and configured to monitor a clamp pressure of the injection mold.

35. The system of claim 33, wherein one of the plurality of additional sensors disposed outside the housing is a temperature sensor attached to another portion of the injection mold, the temperature sensor configured to monitor a temperature of the injection mold.

36. The system of claim 33, wherein one of the plurality of additional sensors disposed outside the housing is a flow control sensor attached to another portion of the injection mold, the flow control sensor configured to monitor flow of a water line of the injection mold.

37. The system of claim 33, wherein one of the plurality of additional sensors disposed outside the housing is a water presence sensor, the water presence sensor configured to monitor for the presence of water adjacent the injection mold.

38. A system for monitoring an injection mold or stamping die, comprising:
 a plurality of sensors, including:
  a first sensor configured to detect at least one of an opening and closing of an injection mold or stamping die; and
  a second sensor configured to detect a predetermined characteristic;
 a plurality of radio communication devices comprised of a first radio communication device configured to communicate wirelessly over a wide area network with a data center using one radio frequency band, and a second radio communication device configured to communicate wirelessly over the wide area network with the data center using another radio frequency band that is different than the one radio frequency band;
 a processor in communication with the plurality of sensors and the plurality of radio communications devices, the processor executing a program stored in a non-transitory medium to:
  maintain a count of production cycles for an injection mold or stamping die according to detection by first sensor;
  transmit a message including the count via at least one of the plurality of radio communication devices;
  after transmitting the message, wait for an acknowledgment wirelessly transmitted thereto; and
  after failing to receive the acknowledgment within a predetermined amount of time, transmit the message again via the at least one of the plurality of radio communication devices with a different transmission characteristic;
 a power supply configured to supply electrical power to the plurality of sensors, the plurality of radio communication devices, and the processor.

39. The system of claim 38, further comprising a rechargeable battery configured to supply electrical power to the plurality of sensors, the plurality of radio communications devices, and the processor when the power supply is unable to supply electrical power thereto.

* * * * *